(12) United States Patent
Dai et al.

(10) Patent No.: US 10,114,196 B2
(45) Date of Patent: Oct. 30, 2018

(54) CAMERA LENS

(71) Applicant: ZHEJIANG SUNNY OPTICS CO., LTD., Ningbo (CN)

(72) Inventors: Fujian Dai, Ningbo (CN); Lin Huang, Ningbo (CN)

(73) Assignee: ZHEJIANG SUNNY OPTICS CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 14/913,646

(22) PCT Filed: Jan. 6, 2015

(86) PCT No.: PCT/CN2015/070183
§ 371 (c)(1),
(2) Date: Feb. 22, 2016

(87) PCT Pub. No.: WO2016/109938
PCT Pub. Date: Jul. 14, 2016

(65) Prior Publication Data
US 2017/0357081 A1    Dec. 14, 2017

(51) Int. Cl.
*G02B 13/00* (2006.01)
*G02B 9/64* (2006.01)
*G02B 13/18* (2006.01)

(52) U.S. Cl.
CPC ........... *G02B 13/0045* (2013.01); *G02B 9/64* (2013.01); *G02B 13/18* (2013.01)

(58) Field of Classification Search
CPC .. G02B 13/0045; G02B 9/64; G02B 27/0025; G02B 13/18; G02B 3/04; G02B 13/002; G02B 3/02; G02B 13/0015
See application file for complete search history.

(56) References Cited

U.S. PATENT DOCUMENTS 4,597,641 A    7/1986 Arai
8,599,495 B1 * 12/2013 Tsai .................. G02B 13/0045
                                                    359/708
(Continued)

FOREIGN PATENT DOCUMENTS

CN    202886720 U    4/2013
CN    203941337 U    11/2014
(Continued)

OTHER PUBLICATIONS

International Search Report corresponding to International Patent Application No. PCT/CN2015/070183, dated Oct. 9, 2015, 2 pgs.

*Primary Examiner* — Bumsuk Won
*Assistant Examiner* — Balram Parbadia
(74) *Attorney, Agent, or Firm* — Lathrop Gage LLP

(57) ABSTRACT

Provided is a camera lens, including a first lens, a second lens, a third lens, a fourth lens, a fifth lens, a sixth lens and a seventh lens from an object side to an image side of the camera lens in turn. The first lens is of a positive focal power, an object side surface of the first lens is convex; an object side surface of the fourth lens is concave; the fifth lens is of a positive focal power; the seventh lens is of a negative focal power. The camera lens further includes an aperture stop arranged between a photographed object and the second lens, the camera lens meets the following formula: TTL/ImgH<2.4; 1.5<CT1/CT2<4.

18 Claims, 14 Drawing Sheets

(56) References Cited

U.S. PATENT DOCUMENTS

| | | | |
|---|---|---|---|
| 2010/0128364 A1* | 5/2010 | Agatsuma | G02B 15/177 359/689 |
| 2014/0009843 A1 | 1/2014 | Tsai et al. | |
| 2014/0376105 A1 | 12/2014 | Sekine | |
| 2015/0009578 A1 | 1/2015 | Shinohara et al. | |
| 2015/0070783 A1 | 3/2015 | Hashimoto et al. | |
| 2015/0103414 A1* | 4/2015 | Baik | G02B 9/64 359/708 |
| 2015/0268448 A1* | 9/2015 | Kubota | G02B 9/64 359/755 |

FOREIGN PATENT DOCUMENTS

| | | |
|---|---|---|
| CN | 203965708 U | 11/2014 |
| CN | 204028445 U | 12/2014 |

* cited by examiner

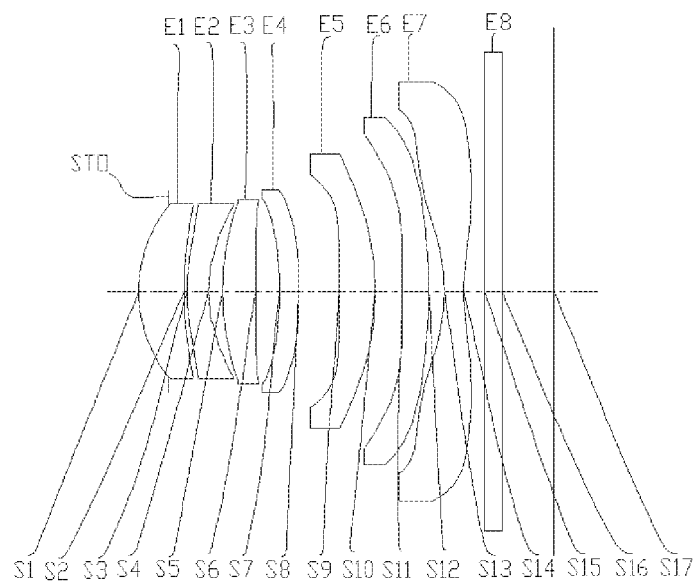
Fig. 36
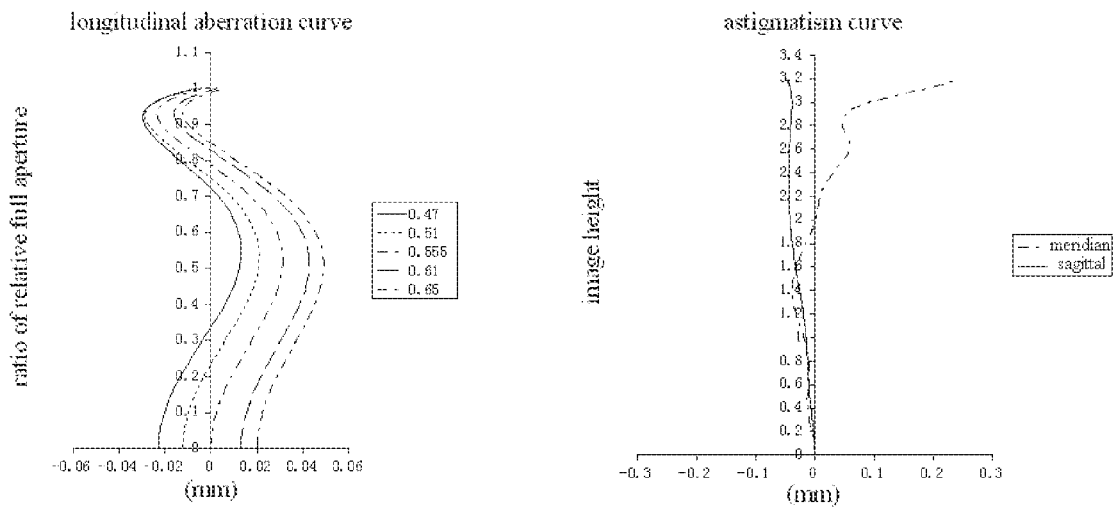
Fig. 37
Fig. 38

CAMERA LENS

FIELD

The present disclosure relates to an imaging technology, in particularly to a camera lens.

BACKGROUND

With the improvements in properties of charge-coupled device (CCD) and complementary metal-oxide semiconductor (CMOS) image sensors, as well as the reduction in size, it requires the corresponding camera lens to meet demands on high imaging quality and miniaturization.

Currently, most camera lenses used in portable electronic products may encompass three to five lenses. However, with the development of the portable electronic products, requirements to pixel and imaging quality becomes higher and higher with a miniaturized camera lens. As a conventional camera lens cannot meet such requirements for the electric devices, there needs a camera lens applied in the portable electronic products and catering the miniaturization characteristic of the electronic products on the basis of acquiring the high pixel and the high imaging quality.

SUMMARY

Embodiments of the present disclosure seek to solve at least one of the problems existing in the related art.

An object of the present disclosure is to provide a camera lens, including a first lens, a second lens, a third lens, a fourth lens, a fifth lens, a sixth lens and a seventh lens from an object side of the camera lens to an image side of the camera lens in turn, wherein the first lens is of a positive focal power, an object side surface of the first lens is convex;

an object side surface of the fourth lens is concave;

the fifth lens is of a positive focal power;

the seventh lens is of a negative focal power, wherein the camera lens further includes an aperture stop arranged between a photographed object and the second lens, the camera lens meets the following formula:

$TTL/ImgH<2.4$;

$1.5<CT1/CT2<4$, wherein TTL is a total length of the camera lens,

ImgH equals to half of a diameter of an effective pixel region at an imaging side surface, CT1 is a central thickness of the first lens, and CT2 is a central thickness of the second lens.

In some embodiments, an image side surface of the first lens is concave, an image side surface of the fifth lens is convex, and an object side surface of the seventh lens is concave.

In some embodiments, the camera lens meets the following formula:

$|f23/f|<12$;

wherein f23 represents a combined focal length of the second lens and the third lens, and f represents an effective focal length of the camera lens.

In some embodiments, the camera lens meets the following formula:

$0<f1/f<2$; and $-4<(R1+R2)/(R1-R2)<-1$, wherein f1 represents a focal length of the first lens, and R1 and R2 represent curvature radiuses of the object side surface and the image side surface of the first lens, respectively.

In some embodiments, the camera lens meets the following formula:

$0<f5/f<6.5$; and $-2.5<R10/f<0$, wherein f5 represents a focal length of the fifth lens, and R10 represents a curvature radius of the image side surface of the fifth lens.

In some embodiments, the camera lens meets the following formula:

$-1.5<f7/f<0$; and $-3.0<R13/f<0$, wherein f7 represents a focal length of the seventh lens, and R13 represents a curvature radius of the object side surface of the seventh lens.

In some embodiments, the camera lens meets the following formula:

$0.5<f/f123<1.5$, wherein f123 represents a combined focal length of the first lens, the second lens and the third lens.

In some embodiments, the second lens is of a negative focal power, an object side surface of the second lens is convex, and an image side surface of the second lens is concave; and the third lens is of a positive focal power, an object side surface of the third lens is convex, and an image side surface of the third lens is concave.

In some embodiments, an image side surface of the fourth lens is convex.

In some embodiments, an object side surface of the fifth lens is concave; and an object side surface of the sixth lens is convex.

The present disclosure further provides in embodiments a camera lens, including a first lens, a second lens, a third lens, a fourth lens, a fifth lens, a sixth lens and a seventh lens from an object side of the camera lens to an image side of the camera lens in turn, wherein the first lens is of a positive focal power, an object side surface of the first lens is convex;

the second lens is of a negative focal power;

an object side surface of the third lens is convex and an image side surface of the third lens is concave;

the fifth lens is of a positive focal power; and the seventh lens is of a negative focal power, wherein the camera lens further includes an aperture stop arranged between a photographed object and the second lens, the camera lens meets the following formula:

$TTL/ImgH<2.4$, wherein TTL is a total length of the camera lens, and

ImgH equals to half of a diameter of an effective pixel region at an imaging side surface.

In some embodiments, the camera lens meets the following formula:

$$f123/f567 \leq -0.3,$$

in which f123 represents a combined focal length of the first lens, and the second lens and the third lens, f567 represents a combined focal length of the fifth lens, the sixth lens and the seventh lens.

In some embodiments, an object side surface of the second lens is convex, and an image side surface of the second lens is concave.

In some embodiments, an image side surface of the first lens is concave, an image side surface of the fifth lens is convex, and an object side surface of the seventh lens is concave.

In some embodiments, the third lens of the camera lens is of a positive focal power.

In some embodiments, the camera lens meets the following formula:

$$|f23/f| < 12,$$

wherein f23 represents a combined focal length of the second lens and the third lens, and f represents a total focal length of the camera lens.

In some embodiments, the camera lens meets the following formula:

$$-5 < f567/f < -1,$$

wherein f567 represents a combined focal length of the fifth lens, the sixth lens and the seventh lens.

In some embodiments, the camera lens meets the following formula:

$$1 \leq f1/f < 2; \text{ and}$$

$$-4 < (R1+R2)/(R1-R2) < -1,$$

wherein f1 represents a focal length of the first lens, and

R1 and R2 represent curvature radiuses of the object side surface and the image side surface of the first lens, respectively.

In some embodiments, the camera lens meets the following formula:

$$0 < f5/f < 3; \text{ and}$$

$$-1 < R10/f < 0,$$

wherein f5 represents a focal length of the fifth lens, and R10 represents a curvature radius of the image side surface of the fifth lens.

In some embodiments, the camera lens meets the following formula:

$$-1.5 < f7/f < 0; \text{ and}$$

$$-3.0 < R13/f < 0,$$

wherein f7 represents a focal length of the seventh lens, and R13 represents a curvature radius of the object side surface of the seventh lens.

In some embodiments, an object side surface of the fourth lens is concave, and an image side surface of the fourth lens is convex.

In some embodiments, an object side surface of the fifth lens is concave, and an object side surface of the sixth lens is convex.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 36 is a schematic view showing the camera lens according to Example 8 of the present disclosure;

FIG. 37 is a diagram showing a longitudinal aberration curve (mm) of the camera lens in Example 8;

FIG. 38 is a diagram showing an astigmatism curve (mm) of the camera lens in Example 8;

DETAILED DESCRIPTION

Figure 1:
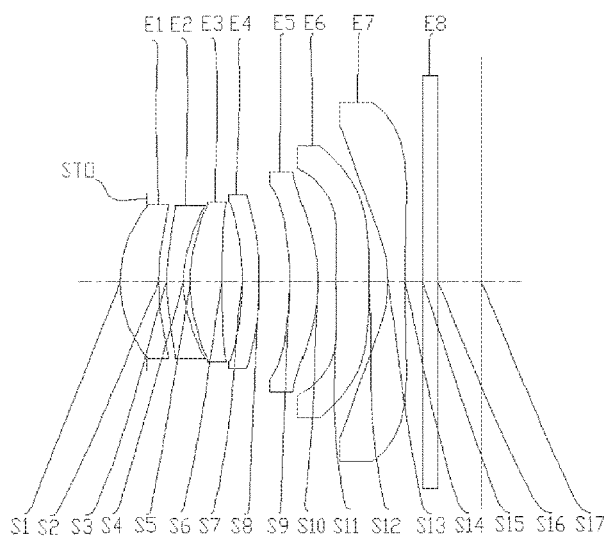
FIG. 1 is a schematic view showing the camera lens according to Example 1 of the present disclosure.

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present invention.

In the description of the present disclosure, it shall be appreciated that, terms "first", "second" are just used herein for purposes of description and are not intended to indicate or imply relative importance or significance or to imply the number of indicated technical features. Thus, the feature defined with "first" and "second" may explicitly or implicitly comprise one or more this feature. In the description of the present disclosure, unless specified otherwise, "a plurality of" means two or more than two.

In the description of the present disclosure, it should be noted that, unless otherwise clearly defined and limited, the terms "mounted," "connected", "connection" should be broadly understood, and may be, for example, fixed connections, detachable connections, or integral connections; may also be electrical connections or may communicate with each other; may also be direct connections or indirect connections via intermediation; may also be inner communications or interaction relationship of two elements, which can be understood by those ordinary skilled in the art according to specific situations.

Various embodiments and examples are provided in the following descriptions to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

With reference to FIG. 1, in an embodiment of the present disclosure, a camera lens includes a first lens E1, a second lens E2, a third lens E3, a fourth lens E4, a fifth lens E5, a sixth lens E6 and a seventh lens E7 from an object side of the camera lens to an image side of the camera lens in turn, in which the first lens is of a positive focal power, an object side surface S1 of the first lens is convex;

an object side surface S7 of the fourth lens is concave;

the fifth lens is of a positive focal power;

the seventh lens is of a negative focal power, wherein the camera lens further includes an aperture stop arranged STO between a photographed object and the second lens E2, the camera lens meets the following formula:

$TTL/\mathrm{Img}H < 2.4;$ $1.5 < CT1/CT2 < 4,$ in which TTL is a total length of the camera lens, ImgH equals to half of a diameter of an effective pixel region at an imaging side surface, CT1 is a central thickness of the first lens, and CT2 is a central thickness of the second lens.

The formulas above are beneficial to the miniaturization of the lens.

Specifically, the first lens E1 includes an object side surface S1 and an image side surface S2. The second lens E2 includes an object side surface S3 and an image side surface S4. The third lens E3 includes an object side surface S5 and an image side surface S6. The forth lens E4 includes an object side surface S7 and an image side surface S8. The fifth lens E5 includes an object side surface S9 and an image side surface S10. The sixth lens E6 includes an object side surface S11 and an image side surface S12. The seventh lens E7 includes an object side surface S13 and an image side surface S14.

In some embodiments, the image side surface S2 of the first lens E1 is concave, the image side surface S10 of the fifth lens E5 is convex, and the object side surface S13 of the seventh lens E7 is concave.

Such shape design may further improve the imaging quality and facilitate the miniaturization.

In some embodiments, the camera lens meets the following formula:

$$|f23/f|<12,$$

in which f23 represents a combined focal length of the second lens E2 and the third lens E3, and f represents an effective focal length of the camera lens.

Meeting above formula may be beneficial to correct the astigmatism of the camera lens.

In some embodiments, the camera lens meets the following formula:

$$0<f1/f<2; \text{ and}$$

$$-4<(R1+R2)/(R1-R2)<-1,$$

in which f1 represents a focal length of the first lens, and R1 and R2 represent curvature radiuses of the object side surface and the image side surface of the first lens respectively.

The limitation of the above formulas for the first lens may guarantee that the present camera lens has a larger field angle and an appropriate focal power distribution is beneficial for the miniaturization design of the camera lens.

In some embodiments, the camera lens meets the following formula:

$$0<f5/f<6.5; \text{ and}$$

$$-2.5<R10/f<0,$$

in which f5 represents a focal length of the fifth lens, and R10 represents a curvature radius of the image side surface of the fifth lens.

The limitation of the above formulas for the fifth lens may moderate a beam angle of the camera lens effectively and reduce a tolerance of sensitivity.

In some embodiments, the camera lens meets the following formula:

$$-1.5<f7/f<0; \text{ and}$$

$$-3.0<R13/f<0,$$

in which f7 represents a focal length of the seventh lens, and

R13 represents a curvature radius of the object side surface of the seventh lens.

The seventh lens meeting the demand of above formula, in cooperation with other lens shapes and dioptre characteristics, may well calibrate a variety of aberrations in system, reduce distortion and improve resolution of the present lens.

In some embodiments, the camera lens meets the following formula:

$$0.5<f/f123<1.5,$$

in which f123 represents a combined focal length of the first lens, the second lens and the third lens.

The above formula is satisfied to help to shorten the total length of the camera lens and increase the field angle.

In some embodiments, the second lens is of a negative focal power, an object side surface of the second lens is convex, and an image side surface of the second lens is concave; and the third lens is of a positive focal power, an object side surface of the third lens is convex, and an image side surface of the third lens is concave.

In some embodiments, an image side surface of the fourth lens is convex.

In some embodiments, an object side surface of the fifth lens is concave; and an object side surface of the sixth lens is convex.

In another aspect, the present disclosure provides in embodiments a camera lens, including a first lens, a second lens, a third lens, a fourth lens, a fifth lens, a sixth lens and a seventh lens from an object side of the camera lens to an image side of the camera lens in turn, in which the first lens is of a positive focal power, an object side surface of the first lens is convex;

the second lens is of a negative focal power;

an object side surface of the third lens is convex and an image side surface of the third lens is concave;

the fifth lens is of a positive focal power; and the seventh lens is of a negative focal power, in which the camera lens further includes an aperture stop arranged between a photographed object and the second lens, the camera lens meets the following formula:

$$TTL/\text{Img}H<2.4,$$

in which TTL is a total length of the camera lens, and ImgH equals to half of a diameter of an effective pixel region at an imaging side surface.

The formulas above are beneficial to the miniaturization of the lens.

In some embodiments, the camera lens meets the following formula:

$$f123/f567 \leq -0.3,$$

in which f123 represents a combined focal length of the first lens, the second lens and the third lens, and f567 represents a combined focal length of the fifth lens, the sixth lens and the seventh lens.

In one aspect, the appropriate distribution of the focal power is beneficial to the miniaturization of the lens, and in another aspect it may increase the field angle and improve the imaging quality of the lens.

In some embodiments, an object side surface of the second lens is convex, and an image side surface of the second lens is concave. The third lens of the camera lens is of a positive focal power. An image side surface of the first lens is concave, an image side surface of the fifth lens is convex, and an object side surface of the seventh lens is concave.

Such a cooperation of focal power and shape may further improve the imaging quality and facilitate the miniaturization.

In some embodiments, the camera lens meets the following formula:

$|f23/f|<12$, in which f23 represents a combined focal length of the second lens and the third lens, f represents a total focal length of the camera lens.

The demand of above formula may be beneficial to an amendment of the astigmatism of the camera lens.

In some embodiments, the camera lens meets the following formula:

$-5<f567/f<-1$, in which f567 represents a combined focal length of the fifth lens, the sixth lens and the seventh lens.

It is beneficial to the miniaturization of the camera lens, and a shape feature is combined to improve the imaging quality and reduce the tolerance of sensitivity.

In some embodiments, the camera lens meets the following formula:

$1 \leq f1/f<2$; and $-4<(R1+R2)/(R1-R2)<-1$, in which f1 represents a focal length of the first lens, and R1 and R2 represent curvature radiuses of the object side surface and the image side surface of the first lens, respectively.

The limitation of the above formulas for the first lens may guarantee that the present camera lens has a bigger field angle and an appropriate focal power distribution is beneficial to the miniaturization design of the camera lens.

In some embodiments, the camera lens meets the following formula:

$0<f5/f<3$; and $-1<R10/f<0$, in which f5 represents a focal length of the fifth lens, and R10 represents a curvature radius of the image side surface of the fifth lens.

The limitation of the above formulas for the fifth lens E5 may moderate a beam angle of the camera lens effectively and reduce a tolerance of sensitivity.

In some embodiments, the camera lens meets the following formula:

$-1.5<f7/f<0$; and $-3.0<R13/f<0$, in which f7 represents a focal length of the seventh lens, and R13 represents a curvature radius of the object side surface of the seventh lens.

The seventh lens meeting the demand of above formula, in cooperation with other lens shapes and dioptre characteristics, may well calibrate a variety of aberrations in system, reduce distortion and improve resolution of the present lens.

In some embodiments, an object side surface of the fourth lens is concave, and an image side surface of the fourth lens is convex. An object side surface of the fifth lens is concave, and an object side surface of the sixth lens is convex.

The shape is limited by above formula to help to further shorten the total length of the camera lens and improving the imaging quality.

An aperture stop is STO. In following specific embodiments 4 and 5, the aperture stop STO is attached to the object side surface S3 of the second lens E2. In rest of the embodiments, the aperture stop STO is before the object side surface S1 of the first lens.

During imaging, light is imaged at the imaging side surface S17 after entering the camera lens and passing through a light filter E8 having an object side surface S15 and an image side surface S16.

In some embodiments, parts of the first lens E1, the second lens E2, the third lens E3, the fourth lens E4, the fifth lens E5, the sixth lens E6 and the seventh lens E7 may be aspheric shape lenses.

A surface shape of the aspheric shape is defined by a formula as below:

$$x = \frac{ch^2}{1+\sqrt{1-(k+1)c^2h^2}} + \sum A i h^i,$$

in which h is a height from any point on the aspheric shape to an optical axis, c is an apex curvature, k is a conic coefficient, Ai is a coefficient for the i-th order of the aspheric.

Example 1

In example 1, the camera lens meets the conditions of the following tables:

TABLE 1

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| STO | spherical | infinity | -0.3702 | | 1.0500 | 0.0000 |
| S1 | aspheric | 1.6562 | 0.5325 | 1.54, 56.1 | 1.0626 | 0.0690 |
| S2 | aspheric | 3.3044 | 0.1068 | | 1.0534 | -4.5372 |
| S3 | aspheric | 2.5318 | 0.2366 | 1.64, 23.8 | 1.0588 | 0.2705 |
| S4 | aspheric | 1.5479 | 0.0941 | | 1.0590 | -1.7840 |
| S5 | aspheric | 2.1762 | 0.4382 | 1.54, 56.1 | 1.0762 | -3.9171 |
| S6 | aspheric | 11.5860 | 0.2775 | | 1.0980 | -99.9900 |
| S7 | aspheric | -5.0615 | 0.2408 | 1.54, 56.1 | 1.1080 | 18.7435 |
| S8 | aspheric | -5.5386 | 0.4231 | | 1.2016 | -16.1783 |
| S9 | aspheric | -4.0664 | 0.3864 | 1.54, 56.1 | 1.3469 | -1.2646 |
| S10 | aspheric | -2.2475 | 0.2470 | | 1.5192 | -0.7032 |
| S11 | aspheric | 6.9383 | 0.4570 | 1.64, 23.8 | 1.5747 | -62.0407 |
| S12 | aspheric | -55.8310 | 0.2650 | | 1.8836 | 50.0000 |
| S13 | aspheric | -1.6797 | 0.2350 | 1.54, 56.1 | 2.1579 | -1.8847 |
| S14 | aspheric | 17.2799 | 0.2500 | | 2.4817 | -47.5002 |

TABLE 1-continued

| No. of surface | Surface type | Curvature radius | Thickness | Refractive Index/Abbe number | Effective aperture | Conic coefficient |
|---|---|---|---|---|---|---|
| S15 | spherical | infinity | 0.2100 | 1.52, 64.2 | 2.8001 | 0.0000 |
| S16 | spherical | infinity | 0.5999 |  | 2.8594 | 0.0000 |
| S17 | spherical | infinity |  |  | 3.1306 | 0.0000 |

TABLE 2

| No. of surface | A4 | A6 | A8 | A10 | A12 |
|---|---|---|---|---|---|
| S1 | −6.1281E−03 | 4.3661E−03 | 0.0000E+00 | 0.0000E+00 | 0.0000E+00 |
| S2 | −1.0340E−02 | −2.8693E−03 | 0.0000E+00 | 0.0000E+00 | 0.0000E+00 |
| S3 | −1.0662E−01 | 1.5664E−02 | 0.0000E+00 | 0.0000E+00 | 0.0000E+00 |
| S4 | −8.0168E−02 | 4.9781E−02 | 0.0000E+00 | 0.0000E+00 | 0.0000E+00 |
| S5 | −1.2354E−02 | 1.9507E−02 | 0.0000E+00 | 0.0000E+00 | 0.0000E+00 |
| S6 | −1.5146E−02 | 2.2755E−02 | 0.0000E+00 | 0.0000E+00 | 0.0000E+00 |
| S7 | −4.8131E−02 | 4.9967E−02 | 0.0000E+00 | 0.0000E+00 | 0.0000E+00 |
| S8 | −5.6105E−02 | 1.5113E−02 | 0.0000E+00 | 0.0000E+00 | 0.0000E+00 |
| S9 | 3.5339E−02 | −2.9113E−02 | 0.0000E+00 | 0.0000E+00 | 0.0000E+00 |
| S10 | 3.0582E−02 | 1.6911E−03 | 0.0000E+00 | 0.0000E+00 | 0.0000E+00 |
| S11 | −8.8267E−02 | −6.5051E−03 | 0.0000E+00 | 0.0000E+00 | 0.0000E+00 |
| S12 | −6.9849E−02 | 5.0946E−03 | 0.0000E+00 | 0.0000E+00 | 0.0000E+00 |
| S13 | 3.9881E−02 | −6.9052E−03 | 1.7282E−03 | −4.3049E−04 | 3.7072E−05 |
| S14 | −9.5037E−03 | 1.3831E−03 | −1.0179E−03 | 1.9753E−04 | −1.5595E−05 |

Furthermore, TTL=5 mm; f1=5.46 mm; f2=−6.86 mm; f3=4.83 mm; f4=−130.97 mm; f5=8.56 mm; f6=9.67 mm; f7=−2.79 mm and f=4.39 mm; Semi-FOV=34.8°; Fno is: 2.1.

Figure 2:
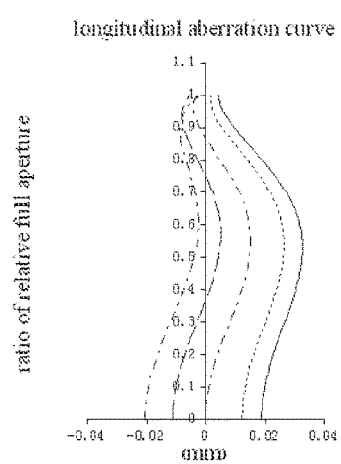
FIG. 2 is a diagram showing a longitudinal aberration curve (mm) of the camera lens in Example 1.
Figure 3:
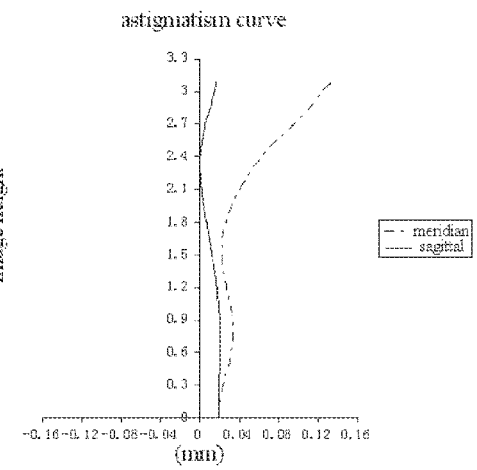
FIG. 3 is a diagram showing an astigmatism curve (mm) of the camera lens in Example 1.
Figure 4:
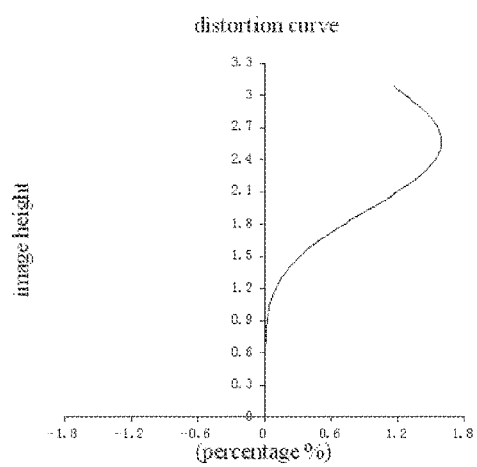
FIG. 4 is a diagram showing a distortion curve (%) of the camera lens in Example 1.
Figure 5:
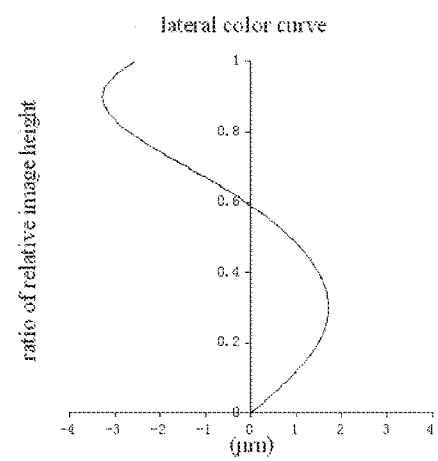
FIG. 5 is a diagram showing a lateral color curve ($\mu$m) of the camera lens in Example 1.
Figure 6:
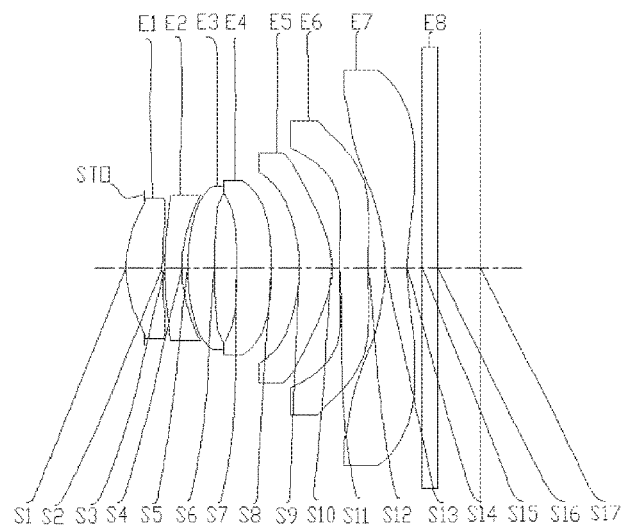
FIG. 6 is a schematic view showing the camera lens according to Example 2 of the present disclosure.

FIG. 2 is a diagram showing a longitudinal aberration curve (mm) of the camera lens in Example 1, FIG. 3 is a diagram showing an astigmatism curve (mm) of the camera lens in Example 1, FIG. 4 is a diagram showing a distortion curve (%) of the camera lens in Example 1, and FIG. 5 is a diagram showing a lateral color curve (μm) of the camera lens in Example 1. It can be seen that the aberration of the camera lens may be controlled effectively.

Embodiment 2

In example 2, the camera lens meets the conditions of the following tables:

TABLE 3

| No. of surface | Surface type | Curvature radius | Thickness | Refractive Index/Abbe number | Effective aperture | Conic coefficient |
|---|---|---|---|---|---|---|
| obj | spherical | infinity | infinity |  | infinity | 0.0000 |
| STO | spherical | infinity | −0.3044 |  | 1.1364 | 0.0000 |
| S1 | aspheric | 2.0754 | 0.6212 | 1.54, 56.1 | 1.1500 | −0.2881 |
| S2 | aspheric | 6.7120 | 0.0378 |  | 1.1784 | −10.6686 |
| S3 | aspheric | 4.3459 | 0.2964 | 1.64, 23.3 | 1.1832 | 0.7303 |
| S4 | aspheric | 2.2247 | 0.1004 |  | 1.1860 | −0.8213 |
| S5 | aspheric | 3.1816 | 0.4596 | 1.54, 56.1 | 1.4124 | −2.2364 |
| S6 | aspheric | 9.9938 | 0.3868 |  | 1.1997 | −30.5767 |
| S7 | aspheric | −13.1039 | 0.5900 | 1.54, 56.1 | 1.2280 | 50.0000 |
| S8 | aspheric | −5.9354 | 0.4784 |  | 1.3882 | 9.2964 |
| S9 | aspheric | −2.6888 | 0.5539 | 1.54, 56.1 | 1.4353 | −0.2459 |
| S10 | aspheric | −1.6553 | 0.1260 |  | 1.5953 | −4.8960 |
| S11 | aspheric | 14.2002 | 0.4952 | 1.64, 23.3 | 1.7113 | −55.0893 |
| S12 | aspheric | 35.7399 | 0.2885 |  | 1.9543 | −29.8514 |
| S13 | aspheric | −3.6144 | 0.3783 | 1.54, 56.1 | 2.0051 | −1.0742 |
| S14 | aspheric | 3.5779 | 0.2572 |  | 2.3565 | −19.7528 |
| S15 | spherical | infinity | 0.2648 | 1.52, 64.2 | 2.4383 | 0.0000 |
| S16 | spherical | infinity | 0.7296 |  | 2.5192 | 0.0000 |
| S17 | spherical | infinity |  |  | 2.8817 | 0.0000 |

TABLE 4

| No. of surface | A4 | A6 | A8 | A10 | A12 |
|---|---|---|---|---|---|
| S1 | 1.4404E−03 | −1.1186E−03 | −1.7499E−03 | 1.9236E−03 | −2.1866E−03 |
| S2 | −9.1946E−03 | −1.7053E−02 | −8.7983E−04 | −1.6163E−03 | 9.5554E−04 |
| S3 | −3.1771E−02 | −4.7329E−03 | −6.2851E−03 | 1.8174E−03 | 1.6806E−03 |
| S4 | −2.3135E−02 | 6.9007E−03 | −1.0954E−03 | −1.8820E−03 | 1.1710E−03 |

TABLE 4-continued

| No. of surface | A4 | A6 | A8 | A10 | A12 |
|---|---|---|---|---|---|
| S5 | −6.4550E−03 | 9.8046E−04 | 3.3175E−03 | 2.7996E−03 | 3.5760E−04 |
| S6 | −5.0326E−03 | −4.6384E−03 | 4.5507E−03 | 2.4574E−03 | 3.3944E−03 |
| S7 | −3.0106E−02 | −1.7366E−02 | −2.9371E−03 | −7.5952E−04 | 2.2674E−03 |
| S8 | −1.6808E−02 | 2.6281E−03 | −2.0791E−02 | 8.1238E−03 | −9.5535E−04 |
| S9 | −3.7400E−02 | 4.7592E−02 | −3.8949E−02 | 8.6742E−03 | −5.9865E−04 |
| S10 | −7.6460E−02 | 7.5334E−02 | −3.5454E−02 | 8.1139E−03 | −7.3351E−04 |
| S11 | −1.7403E−02 | −6.2775E−03 | −3.7875E−03 | 1.3389E−03 | −1.3112E−04 |
| S12 | −3.5767E−03 | −1.1280E−02 | 1.3162E−03 | 6.3190E−05 | −1.0633E−05 |
| S13 | −1.1029E−02 | 6.2807E−03 | −8.1462E−04 | 4.8247E−05 | −1.2439E−06 |
| S14 | −2.6330E−02 | 6.6073E−03 | −9.5612E−04 | 6.6084E−05 | −1.8312E−06 |

Furthermore, TTL=6.06 mm; f1=5.25 mm; f2=−7.49 mm; f3=8.35 mm; f4=19.3 mm; f5=6.63 mm; f6=36.3 mm; f7=−3.23 mm and f=5 mm; Semi-FOV=29.1°; Fno is: 2.2.

Figure 7:
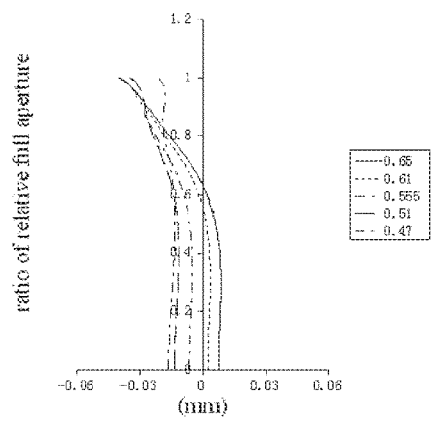
FIG. 7 is a diagram showing a longitudinal aberration curve (mm) of the camera lens in Example 2.
Figure 8:
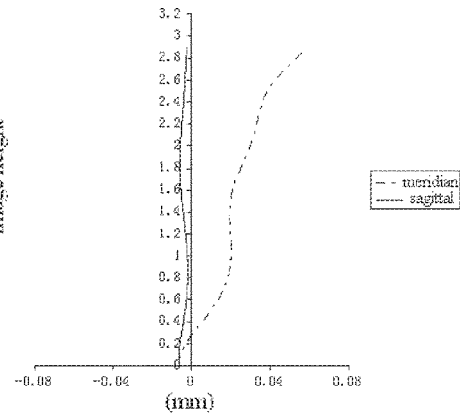
FIG. 8 is a diagram showing an astigmatism curve (mm) of the camera lens in Example 2.
Figure 9:
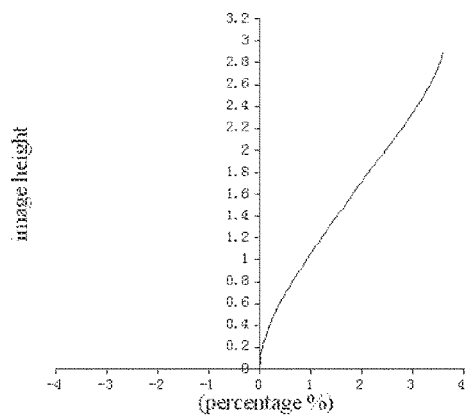
FIG. 9 is a diagram showing a distortion curve (%) of the camera lens in Example 2.
Figure 10:
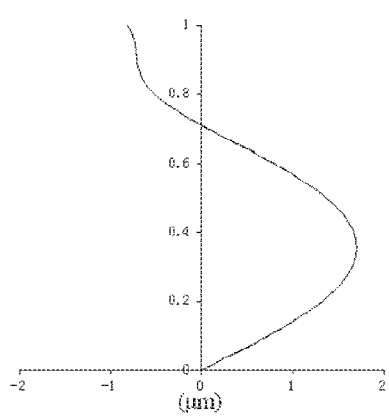
FIG. 10 is a diagram showing a lateral color curve ($\mu$m) of the camera lens in Example 2.
Figure 11:
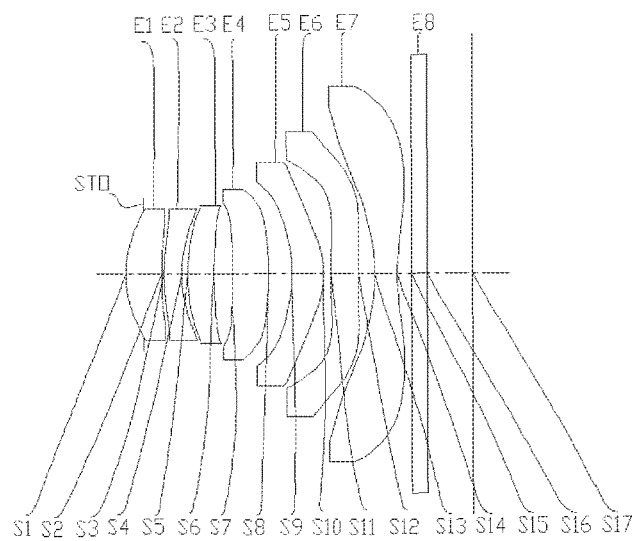
FIG. 11 is a schematic view showing the camera lens according to Example 3 of the present disclosure.

FIG. 7 is a diagram showing a longitudinal aberration curve (mm) of the camera lens in Example 2, FIG. 8 is a diagram showing an astigmatism curve (mm) of the camera lens in Example 2, FIG. 9 is a diagram showing a distortion curve (%) of the camera lens in Example 2, and FIG. 10 is a diagram showing a lateral color curve (μm) of the camera lens in Example 2. It can be seen that the aberration of the camera lens may be controlled effectively.

Embodiment 3

In example 3, the camera lens meets the conditions of the following tables:

TABLE 5

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| STO | spherical | infinity | −0.2348 | | 0.8629 | 0.0000 |
| S1 | aspheric | 1.5830 | 0.4787 | 1.54, 56.1 | 0.8710 | −0.2480 |
| S2 | aspheric | 5.2344 | 0.0300 | | 0.8778 | −9.9817 |
| S3 | aspheric | 3.3831 | 0.2350 | 1.64, 23.3 | 0.8770 | −0.2336 |
| S4 | aspheric | 1.7513 | 0.0771 | | 0.8709 | −0.8269 |
| S5 | aspheric | 2.5402 | 0.3503 | 1.54, 56.1 | 0.8800 | −2.3101 |
| S6 | aspheric | 6.7830 | 0.2473 | | 0.9242 | −37.5279 |
| S7 | aspheric | −30.3649 | 0.4816 | 1.54, 56.1 | 0.9573 | 50.0000 |
| S8 | aspheric | −5.3111 | 0.3098 | | 1.1359 | 13.1272 |
| S9 | aspheric | −1.8762 | 0.4096 | 1.54, 56.1 | 1.2243 | −0.7668 |
| S10 | aspheric | −1.2562 | 0.0999 | | 1.4937 | −4.6285 |
| S11 | aspheric | 9.6141 | 0.3627 | 1.64, 23.3 | 1.5245 | −55.0893 |
| S12 | aspheric | 33.7745 | 0.2189 | | 1.9026 | −29.8514 |
| S13 | aspheric | −2.8241 | 0.3000 | 1.54, 56.1 | 2.2357 | −0.8054 |
| S14 | aspheric | 2.7828 | 0.1895 | | 2.5092 | −19.0659 |
| S15 | spherical | infinity | 0.2100 | 1.52, 64.2 | 2.8632 | 0.0000 |
| S16 | spherical | infinity | 0.6000 | | 2.9245 | 0.0000 |
| S17 | spherical | infinity | | | 3.2053 | 0.0000 |

TABLE 6

| No. of surface | A4 | A6 | A8 | A10 | A12 |
|---|---|---|---|---|---|
| S1 | 4.1137E−03 | 4.8437E−04 | −9.0742E−03 | 1.7686E−02 | −3.1560E−02 |
| S2 | −1.7156E−02 | −5.0734E−02 | −5.8181E−03 | −1.5245E−02 | 8.3683E−03 |
| S3 | −6.7316E−02 | −1.8944E−02 | −3.1239E−02 | 1.2889E−02 | 2.0622E−02 |
| S4 | −4.6421E−02 | 2.0324E−02 | −5.2405E−03 | −1.4123E−02 | 1.3309E−02 |
| S5 | −1.1623E−02 | 1.1368E−02 | 1.7479E−02 | 2.2284E−02 | 6.3358E−03 |
| S6 | −1.0431E−02 | −1.3060E−02 | 2.4245E−02 | 2.3074E−02 | 5.9134E−02 |
| S7 | −6.7780E−02 | −9.0797E−02 | 5.7161E−02 | −1.1590E−01 | 9.1159E−02 |
| S8 | −4.4747E−02 | 4.3948E−02 | −1.8143E−01 | 9.3766E−02 | −1.0675E−02 |
| S9 | −1.8909E−02 | 2.8632E−01 | −3.7285E−01 | 1.4453E−01 | −1.7647E−02 |
| S10 | −1.7181E−01 | 3.2157E−01 | −2.4013E−01 | 8.4819E−02 | −1.1901E−02 |
| S11 | −4.4428E−02 | −2.6406E−02 | −3.4194E−02 | 2.1436E−02 | −3.5760E−03 |
| S12 | 2.9240E−03 | −5.9897E−02 | 1.5351E−03 | 1.8594E−04 | −1.6596E−04 |
| S13 | −2.4075E−02 | 1.9672E−02 | −3.6949E−03 | 2.7681E−04 | −6.2307E−06 |
| S14 | −6.3963E−02 | 2.6426E−02 | −6.7816E−03 | 8.3730E−04 | −4.3511E−05 |

Furthermore, TTL=4.6 mm; f1=3.97 mm; f2=−5.98 mm; f3=7.23 mm; f4=11.71 mm; f5=5.65 mm; f6=20.75 mm; f7=−2.52 mm and f=3.8 mm; Semi-FOV=40.12°; Fno is: 2.2.

Figure 12:
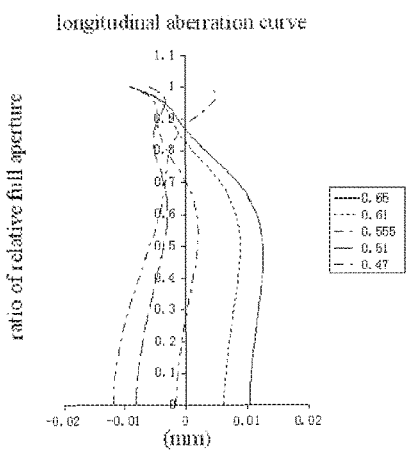
FIG. 12 is a diagram showing a longitudinal aberration curve (mm) of the camera lens in Example 3.
Figure 13:
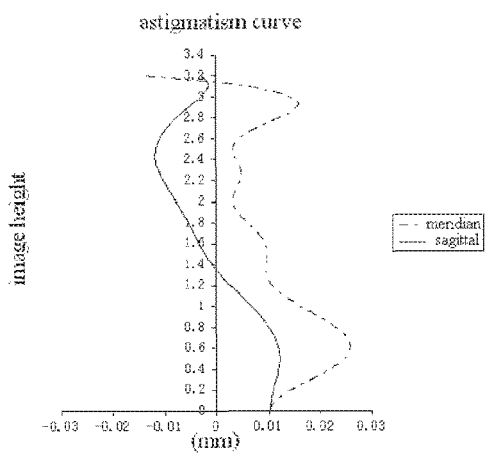
FIG. 13 is a diagram showing an astigmatism curve (mm) of the camera lens in Example 3.
Figure 14:
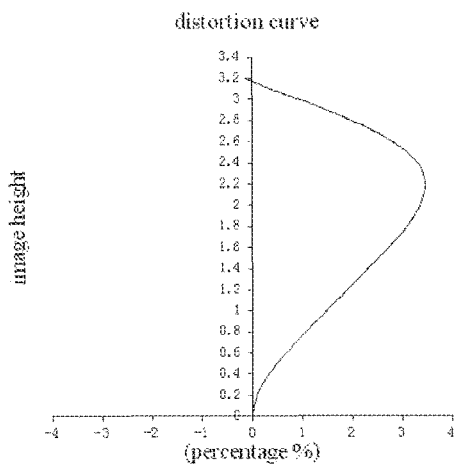
FIG. 14 is a diagram showing a distortion curve (%) of the camera lens in Example 3.
Figure 15:
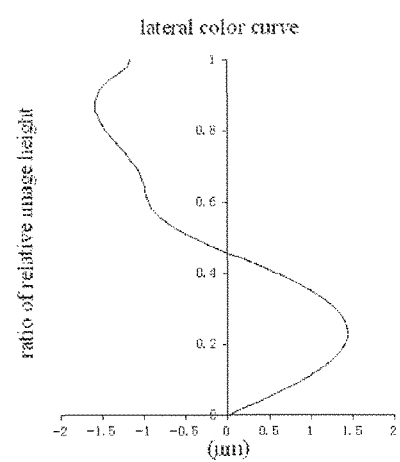
FIG. 15 is a diagram showing a lateral color curve ($\mu$m) of the camera lens in Example 3.
Figure 16:
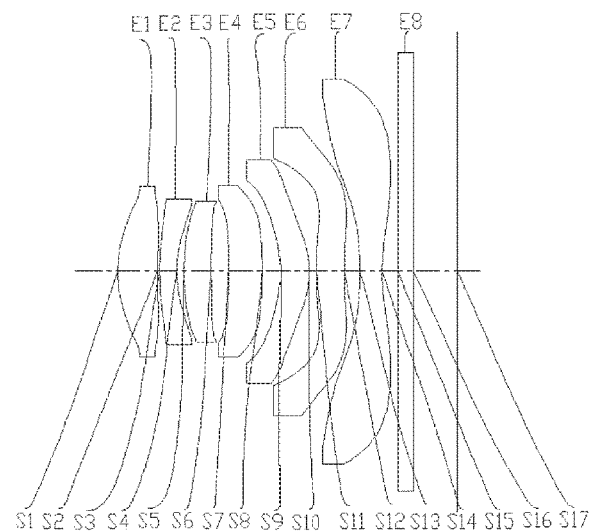
FIG. 16 is a schematic view showing the camera lens according to Example 4 of the present disclosure.

FIG. 12 is a diagram showing a longitudinal aberration curve (mm) of the camera lens in Example 3, FIG. 13 is a diagram showing an astigmatism curve (mm) of the camera lens in Example 3, FIG. 14 is a diagram showing a distortion curve (%) of the camera lens in Example 3, and FIG. 15 is a diagram showing a lateral color curve (μm) of the camera lens in Example 3. It can be seen that the aberration of the camera lens may be controlled effectively.

Embodiment 4

In example 4, the camera lens meets the conditions of the following tables:

Furthermore, TTL=4.6 mm; f1=3.68 mm; f2=−5.87 mm; f3=8.17 mm; f4=11.69 mm; f5=7.52 mm; f6=19.49 mm; f7=−3.02 mm and f=3.68 mm; Semi-FOV=41°; Fno is: 1.82.

Figure 17:
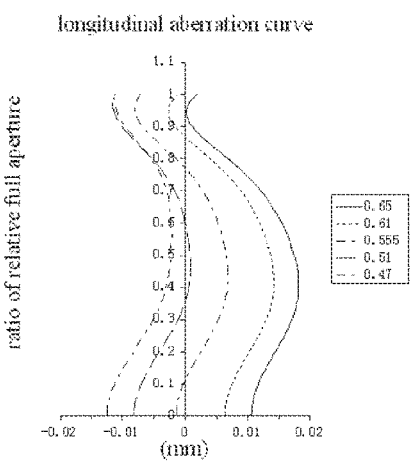
FIG. 17 is a diagram showing a longitudinal aberration curve (mm) of the camera lens in Example 4.
Figure 18:
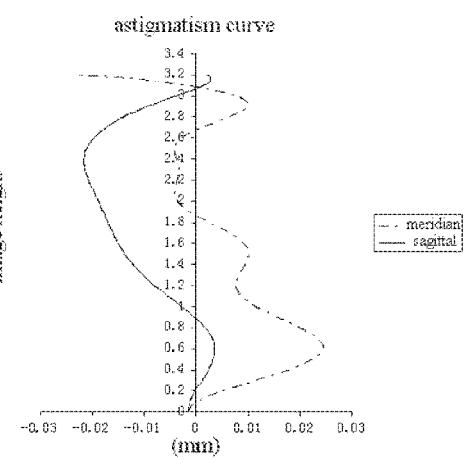
FIG. 18 is a diagram showing an astigmatism curve (mm) of the camera lens in Example 4.
Figure 19:
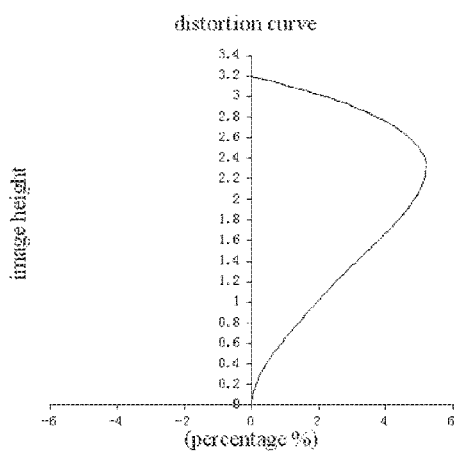
FIG. 19 is a diagram showing a distortion curve (%) of the camera lens in Example 4.
Figure 20:
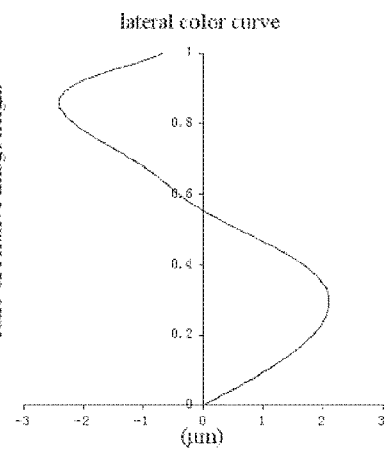
FIG. 20 is a diagram showing a lateral color curve ($\mu$m) of the camera lens in Example 4.
Figure 21:
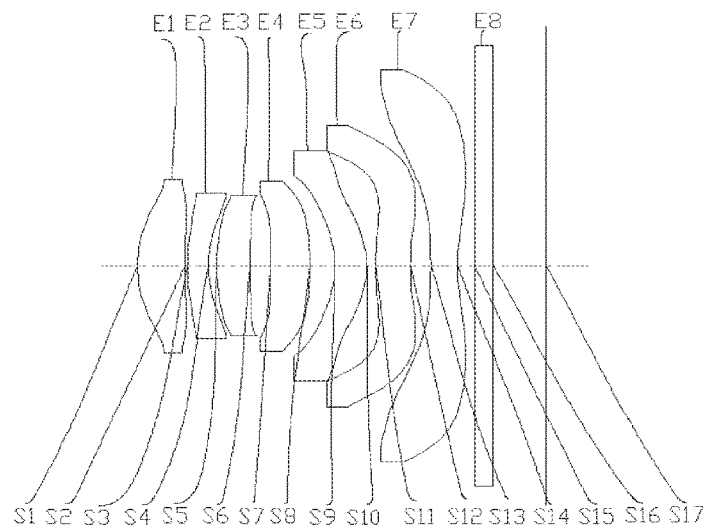
FIG. 21 is a schematic view showing the camera lens according to Example 5 of the present disclosure.

FIG. 17 is a diagram showing a longitudinal aberration curve (mm) of the camera lens in Example 4, FIG. 18 is a diagram showing an astigmatism curve (mm) of the camera lens in Example 4, FIG. 19 is a diagram showing a distortion curve (%) of the camera lens in Example 4, and FIG. 20 is a diagram showing a lateral color curve (μm) of the camera lens in Example 4. It can be seen that the aberration of the camera lens may be controlled effectively.

TABLE 7

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| S1 | aspheric | 1.7629 | 0.5365 | 1.54, 56.1 | 1.1504 | −0.4624 |
| S2 | aspheric | 12.7844 | 0.0300 | | 1.0758 | −20.2773 |
| STO + S3 | aspheric | 3.4615 | 0.2350 | 1.64, 23.3 | 0.9800 | 0.1283 |
| S4 | aspheric | 1.7595 | 0.0930 | | 0.9047 | −1.2003 |
| S5 | aspheric | 3.2376 | 0.3722 | 1.54, 56.1 | 0.9200 | −2.4661 |
| S6 | aspheric | 11.3174 | 0.2328 | | 0.9508 | −99.9900 |
| S7 | aspheric | −1117.5801 | 0.4599 | 1.54, 56.1 | 0.9758 | −99.9900 |
| S8 | aspheric | −6.3471 | 0.2475 | | 1.1610 | 17.1335 |
| S9 | aspheric | −1.5273 | 0.3790 | 1.54, 56.1 | 1.2347 | −1.7496 |
| S10 | aspheric | −1.2106 | 0.0987 | | 1.5107 | −2.9309 |
| S11 | aspheric | 4.3204 | 0.3806 | 1.64, 23.3 | 1.5379 | −55.0893 |
| S12 | aspheric | 6.3611 | 0.2118 | | 1.9477 | −29.8514 |
| S13 | aspheric | −5.2807 | 0.3000 | 1.54, 56.1 | 2.3907 | 0.7610 |
| S14 | aspheric | 2.4449 | 0.2135 | | 2.6069 | −18.4085 |
| S15 | spherical | infinity | 0.2100 | 1.52, 64.2 | 2.9160 | 0.0000 |
| S16 | spherical | infinity | 0.5999 | | 2.9706 | 0.0000 |
| S17 | spherical | infinity | | | 3.2474 | 0.0000 |

TABLE 8

| No. of surface | A4 | A6 | A8 | A10 | A12 |
|---|---|---|---|---|---|
| S1 | −5.1416E−03 | −1.2128E−03 | −2.4734E−02 | 1.1492E−02 | −1.0847E−02 |
| S2 | −2.0033E−02 | −4.2786E−02 | 1.6011E−02 | 2.2182E−02 | −6.0326E−03 |
| S3 | −6.8270E−02 | 3.6065E−03 | −8.6404E−03 | 1.9859E−02 | −6.9015E−03 |
| S4 | −5.4722E−02 | 3.3975E−02 | −5.4177E−03 | −4.1785E−02 | 1.2526E−02 |
| S5 | −8.9509E−03 | 3.3411E−02 | 2.1274E−02 | 2.3570E−02 | −8.8472E−03 |
| S6 | −4.0341E−02 | 1.5133E−02 | 2.9609E−02 | 8.5444E−03 | 6.1346E−02 |
| S7 | −1.1182E−01 | −1.7736E−02 | −1.0771E−01 | 1.2388E−01 | −3.2202E−02 |
| S8 | −6.1477E−02 | 8.6932E−02 | −2.8045E−01 | 1.9728E−01 | −4.4097E−02 |
| S9 | 8.3204E−02 | 1.9274E−01 | −4.3565E−01 | 2.8230E−01 | −6.8409E−02 |
| S10 | 3.2551E−02 | 3.7401E−02 | −3.2150E−02 | 1.0152E−02 | −1.7346E−03 |
| S11 | 1.5951E−02 | −1.3179E−01 | 6.4844E−02 | −2.5399E−02 | 4.5296E−03 |
| S12 | −4.4337E−02 | −2.3117E−02 | 7.0558E−04 | 2.7616E−03 | −4.0520E−04 |
| S13 | −9.1441E−02 | 5.1277E−02 | −1.0945E−02 | 1.0994E−03 | −4.3547E−05 |
| S14 | −5.7770E−02 | 2.4857E−02 | −6.5762E−03 | 8.3469E−04 | −4.3061E−05 |

Embodiment 5

In example 5, the camera lens meets the conditions of the following tables:

TABLE 9

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| S1 | aspheric | 1.7623 | 0.5364 | 1.54, 56.1 | 1.1671 | −0.4794 |
| S2 | aspheric | 9.8090 | 0.0300 | | 1.0912 | −86.8792 |
| STO + S3 | aspheric | 3.0852 | 0.2350 | 1.64, 23.3 | 0.9800 | −1.4864 |
| S4 | aspheric | 1.7490 | 0.0921 | | 0.9071 | −1.3380 |
| S5 | aspheric | 3.3285 | 0.3775 | 1.54, 56.1 | 0.9200 | −2.8264 |
| S6 | aspheric | 12.6721 | 0.2293 | | 0.9434 | −99.9900 |
| S7 | aspheric | −463.2820 | 0.4407 | 1.54, 56.1 | 0.9718 | −99.9900 |
| S8 | aspheric | −5.8531 | 0.2824 | | 1.1449 | 1.3520 |
| S9 | aspheric | −1.3962 | 0.3541 | 1.54, 23.3 | 1.2213 | −1.7629 |
| S10 | aspheric | −1.2092 | 0.0999 | | 1.5496 | −2.8880 |
| S11 | aspheric | 3.9387 | 0.3920 | 1.64, 23.3 | 1.5488 | −55.0893 |
| S12 | aspheric | 3.3513 | 0.2295 | | 1.8960 | −29.8514 |
| S13 | aspheric | −9.4947 | 0.3000 | 1.54, 56.1 | 2.4639 | 6.4629 |
| S14 | aspheric | 2.7592 | 0.1913 | | 2.6469 | −18.4085 |
| S15 | spherical | infinity | 0.2100 | 1.52, 64.2 | 2.9297 | 0.0000 |
| S16 | spherical | infinity | 0.6000 | | 2.9773 | 0.0000 |
| S17 | spherical | infinity | | | 3.2276 | 0.0000 |

TABLE 10

| No. of surface | A4 | A6 | A8 | A10 | A12 |
|---|---|---|---|---|---|
| S1 | −5.3452E−03 | −2.7365E−03 | −2.5665E−02 | 9.1352E−03 | −8.5374E−03 |
| S2 | −2.3393E−02 | −4.3487E−02 | 1.6294E−02 | 2.3406E−03 | −6.4866E−03 |
| S3 | −7.4720E−03 | 2.2225E−03 | −5.7296E−03 | 2.0937E−02 | −8.1600E−03 |
| S4 | −5.7589E−02 | 3.2101E−02 | −7.2057E−03 | −4.3444E−02 | 1.5521E−02 |
| S5 | −8.7910E−03 | 4.2258E−02 | 2.4520E−02 | 2.3251E−02 | −9.4761E−03 |
| S6 | −4.1689E−02 | 2.4085E−02 | 3.5272E−02 | 7.8986E−03 | 6.7339E−02 |
| S7 | −1.0983E−01 | −1.9335E−02 | −1.0436E−01 | 1.3126E−01 | −2.9742E−02 |
| S8 | −5.4740E−02 | 1.8799E−03 | −1.9343E−01 | 1.7893E−01 | −4.4518E−02 |
| S9 | 1.3561E−01 | −1.2004E−02 | −2.3501E−01 | 2.3095E−01 | −7.2491E−02 |
| S10 | 8.2204E−02 | −8.9585E−02 | 8.4307E−02 | −3.4605E−02 | 4.7295E−03 |
| S11 | 3.3539E−02 | −2.0998E−01 | 1.6780E−01 | −7.1993E−02 | 1.1419E−02 |
| S12 | −1.6374E−02 | −6.2213E−02 | 3.5748E−02 | −1.1135E−02 | 1.3256E−03 |
| S13 | −6.8808E−02 | 1.8910E−02 | −8.0312E−04 | −2.2227E−04 | 2.0719E−05 |
| S14 | −5.9820E−02 | 1.9903E−02 | −3.6800E−03 | 3.0981E−04 | −1.1731E−05 |

Furthermore, TTL=4.6 mm; f1=3.84 mm; f2=−6.74 mm; f3=8.15 mm; f4=10.85 mm; f5=8.05 mm; f6=−47.24 mm; f7=−3.88 mm and f=3.72 mm; Semi-FOV=40.7°; Fno is: 1.82.

Figure 22:
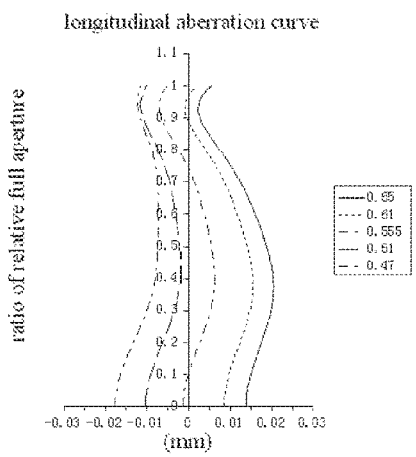
FIG. 22 is a diagram showing a longitudinal aberration curve (mm) of the camera lens in Example 5.
Figure 23:
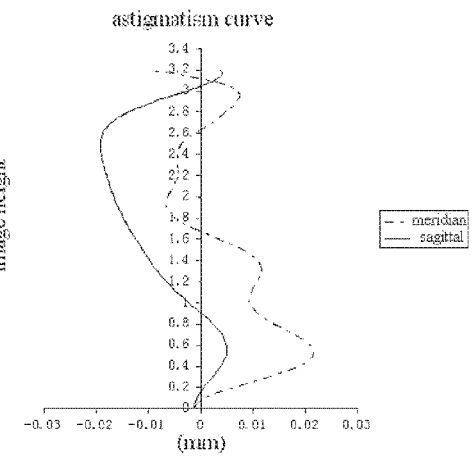
FIG. 23 is a diagram showing an astigmatism curve (mm) of the camera lens in Example 5.
Figure 24:
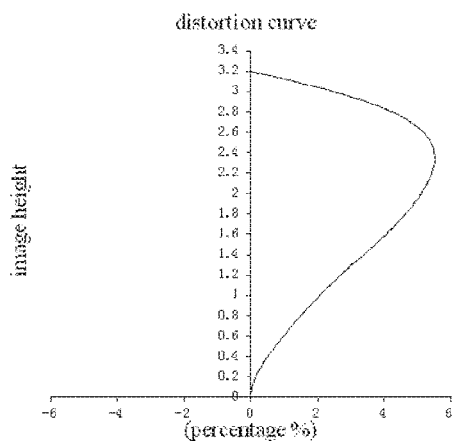
FIG. 24 is a diagram showing a distortion curve (%) of the camera lens in Example 5.
Figure 25:
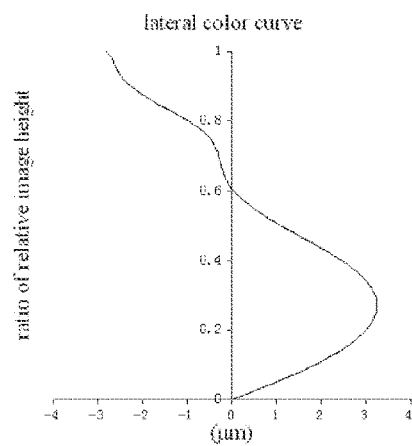
FIG. 25 is a diagram showing a lateral color curve ($\mu$m) of the camera lens in Example 5.
Figure 26:
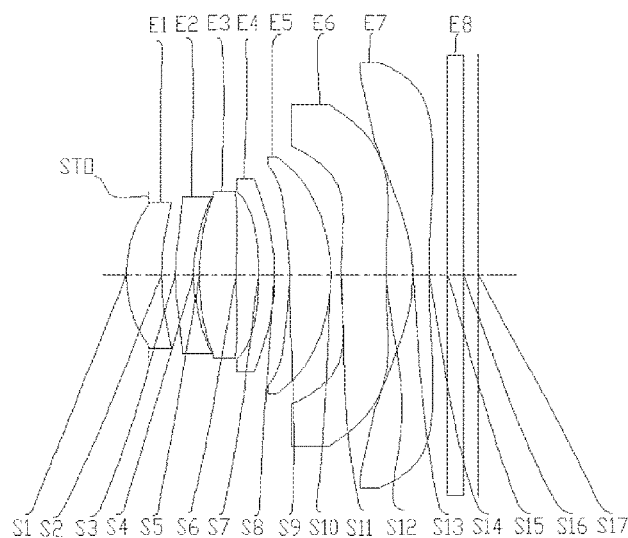
FIG. 26 is a schematic view showing the camera lens according to Example 6 of the present disclosure.

FIG. 22 is a diagram showing a longitudinal aberration curve (mm) of the camera lens in Example 5, FIG. 23 is a diagram showing an astigmatism curve (mm) of the camera lens in Example 5, FIG. 24 is a diagram showing a distortion curve (%) of the camera lens in Example 5, and FIG. 25 is a diagram showing a lateral color curve (μm) of the camera lens in Example 5. It can be seen that the aberration of the camera lens may be controlled effectively.

Embodiment 6

In example 6, the camera lens meets the conditions of the following tables:

TABLE 11

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| STO | spherical | infinity | −0.3000 | | 0.9500 | 0.0000 |
| S1 | aspheric | 1.6562 | 0.4772 | 1.54, 56.1 | 0.9589 | 0.2169 |
| S2 | aspheric | 3.3044 | 0.1816 | | 0.9734 | −3.5555 |
| S3 | aspheric | 2.7789 | 0.2438 | 1.64, 23.8 | 1.0033 | 0.0987 |
| S4 | aspheric | 1.9432 | 0.0789 | | 1.0425 | −1.7634 |
| S5 | aspheric | 3.1918 | 0.4930 | 1.54, 56.1 | 1.0546 | −4.8614 |
| S6 | aspheric | 27.0856 | 0.2993 | | 1.1140 | 119.9275 |
| S7 | aspheric | −5.0750 | 0.2109 | 1.54, 56.1 | 1.1198 | 19.1342 |
| S8 | aspheric | −3.4603 | 0.2011 | | 1.2873 | −6.9697 |

TABLE 11-continued

| No. of surface | Surface type | Curvature radius | Thickness | Refractive Index/Abbe number | Effective aperture | Conic coefficient |
|---|---|---|---|---|---|---|
| S9 | aspheric | −4.0664 | 0.5574 | 1.54, 56.1 | 1.4728 | −9.7159 |
| S10 | aspheric | −2.2475 | 0.1296 | | 1.5800 | 0.3310 |
| S11 | aspheric | 5.1277 | 0.6006 | 1.64, 23.8 | 1.7242 | −39.2702 |
| S12 | aspheric | 7.7208 | 0.3577 | | 2.2902 | 9.6019 |
| S13 | aspheric | −2.2405 | 0.2177 | 1.54, 56.1 | 2.7048 | −1.4065 |
| S14 | aspheric | 11.2661 | 0.2500 | | 2.8514 | 14.1277 |
| S15 | spherical | infinity | 0.2100 | 1.52, 64.2 | 2.9366 | 0.0000 |
| S16 | spherical | infinity | 0.2031 | | 2.9500 | 0.0000 |
| S17 | spherical | infinity | | | 2.9708 | 0.0000 |

TABLE 12

| No. of surface | A4 | A6 | A8 | A10 | A12 |
|---|---|---|---|---|---|
| S1 | −2.6425E−03 | −1.4698E−03 | 0.0000E+00 | 0.0000E+00 | 0.0000E+00 |
| S2 | −7.0065E−03 | −5.4218E−03 | 0.0000E+00 | 0.0000E+00 | 0.0000E+00 |
| S3 | −1.1180E−01 | 1.9060E−02 | 0.0000E+00 | 0.0000E+00 | 0.0000E+00 |
| S4 | −7.7056E−02 | 5.6481E−02 | 0.0000E+00 | 0.0000E+00 | 0.0000E+00 |
| S5 | −1.1578E−02 | 2.8228E−02 | 0.0000E+00 | 0.0000E+00 | 0.0000E+00 |
| S6 | −2.2806E−02 | −5.6465E−04 | 0.0000E+00 | 0.0000E+00 | 0.0000E+00 |
| S7 | −7.5933E−02 | 2.0409E−02 | 0.0000E+00 | 0.0000E+00 | 0.0000E+00 |
| S8 | −5.3155E−02 | 1.6507E−02 | 0.0000E+00 | 0.0000E+00 | 0.0000E+00 |
| S9 | 4.9898E−02 | −2.9816E−02 | 0.0000E+00 | 0.0000E+00 | 0.0000E+00 |
| S10 | 1.9171E−02 | −9.4507E−03 | 0.0000E+00 | 0.0000E+00 | 0.0000E+00 |
| S11 | −4.8874E−02 | −1.5298E−02 | 0.0000E+00 | 0.0000E+00 | 0.0000E+00 |
| S12 | −3.9523E−02 | −1.4138E−03 | 0.0000E+00 | 0.0000E+00 | 0.0000E+00 |
| S13 | 7.9724E−03 | 4.0928E−03 | −1.5660E−04 | −1.1237E−04 | 9.8831E−06 |
| S14 | 1.0775E−03 | −9.3161E−03 | 2.5279E−03 | −2.8624E−04 | 9.6282E−06 |

Furthermore, TTL=4.71 mm; f1=5.52 mm; f2=−11.39 mm; f3=6.58 mm; f4=19.04 mm; f5=8.3 mm; f6=21.9 mm; f7=−3.4 mm and f=3.53 mm; Semi-FOV=42.2°; Fno is: 1.9.

Figure 27:
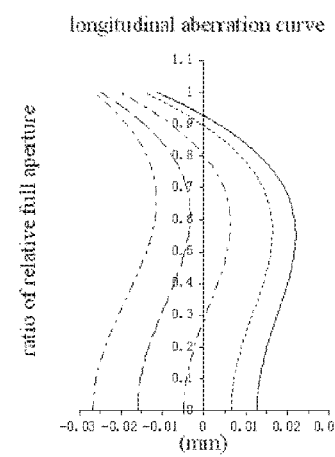
FIG. 27 is a diagram showing a longitudinal aberration curve (mm) of the camera lens in Example 6.
Figure 28:
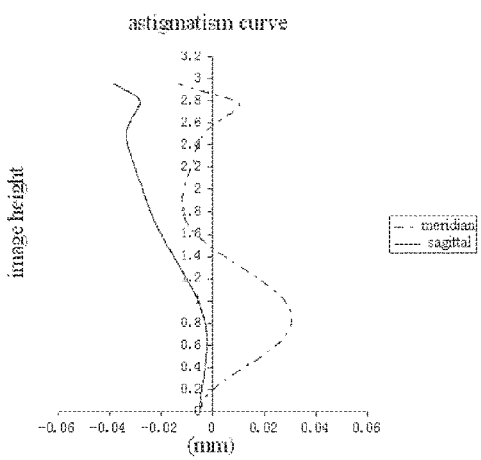
FIG. 28 is a diagram showing an astigmatism curve (mm) of the camera lens in Example 6.
Figure 29:
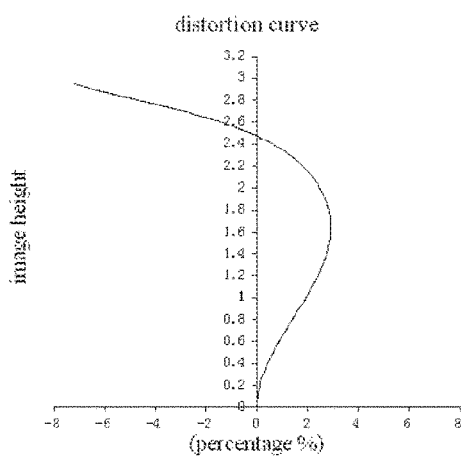
FIG. 29 is a diagram showing a distortion curve (%) of the camera lens in Example 6.
Figure 30:
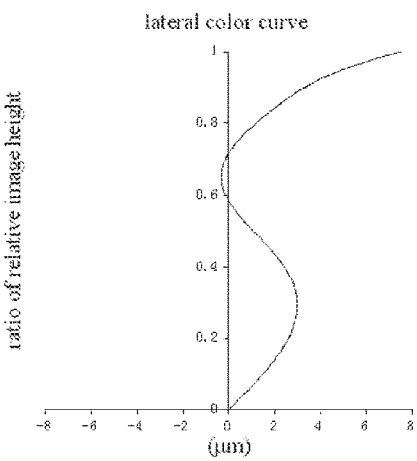
FIG. 30 is a diagram showing a lateral color curve (μm) of the camera lens in Example 6.
Figure 31:
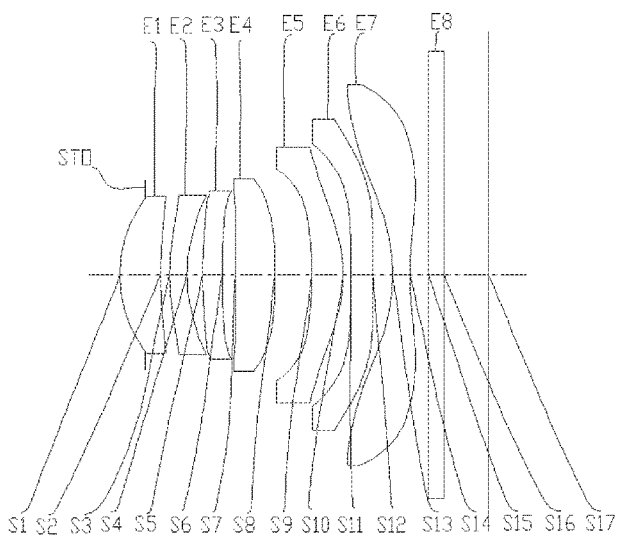
FIG. 31 is a schematic view showing the camera lens according to Example 7 of the present disclosure.

FIG. 27 is a diagram showing a longitudinal aberration curve (mm) of the camera lens in Example 6, FIG. 28 is a diagram showing an astigmatism curve (mm) of the camera lens in Example 6, FIG. 29 is a diagram showing a distortion curve (%) of the camera lens in Example 6, and FIG. 30 is a diagram showing a lateral color curve (μm) of the camera lens in Example 6. It can be seen that the aberration of the camera lens may be controlled effectively.

Embodiment 7

In example 7, the camera lens meets the conditions of the following tables:

TABLE 13

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| STO | spherical | infinity | −0.3428 | | 1.0500 | 0.0000 |
| S1 | aspheric | 1.7768 | 0.5542 | 1.54, 56.1 | 1.0644 | −0.0642 |
| S2 | aspheric | 6.2267 | 0.1196 | | 1.0661 | −22.6246 |
| S3 | aspheric | 2.6392 | 0.2386 | 1.64, 23.8 | 1.0791 | 0.3466 |
| S4 | aspheric | 1.9052 | 0.2109 | | 1.0793 | −0.0996 |
| S5 | aspheric | 7.2791 | 0.2651 | 1.54, 56.1 | 1.0938 | 34.8826 |
| S6 | aspheric | 8.3957 | 0.1810 | | 1.1314 | 49.8943 |
| S7 | aspheric | 14.3276 | 0.5324 | 1.54, 56.1 | 1.1622 | −95.3527 |
| S8 | aspheric | −17.2640 | 0.4943 | | 1.3008 | −99.9900 |
| S9 | aspheric | −6.6943 | 0.4313 | 1.54, 56.1 | 1.4262 | 11.2314 |
| S10 | aspheric | −1.6065 | 0.0993 | | 1.7287 | −5.2636 |
| S11 | aspheric | 100.6863 | 0.2964 | 1.64, 23.8 | 1.7687 | 50.0000 |
| S12 | aspheric | 22.7331 | 0.2702 | | 2.1007 | 47.7901 |
| S13 | aspheric | −2.5401 | 0.2350 | 1.54, 56.1 | 2.4366 | −1.8275 |
| S14 | aspheric | 2.8161 | 0.2500 | | 2.5790 | −33.0379 |
| S15 | spherical | infinity | 0.2100 | 1.52, 64.2 | 2.9716 | 0.0000 |
| S16 | spherical | infinity | 0.6116 | | 3.0277 | 0.0000 |
| S17 | spherical | infinity | | | 3.2874 | 0.0000 |

TABLE 14

| No. of surface | A4 | A6 | A8 | A10 | A12 |
|---|---|---|---|---|---|
| S1 | 2.2668E−03 | 5.6045E−03 | 0.0000E+00 | 0.0000E+00 | 0.0000E+00 |
| S2 | −1.3073E−02 | 6.3133E−03 | 0.0000E+00 | 0.0000E+00 | 0.0000E+00 |
| S3 | −1.0949E−01 | 2.3381E−02 | 0.0000E+00 | 0.0000E+00 | 0.0000E+00 |
| S4 | −9.3655E−02 | 3.5186E−02 | 0.0000E+00 | 0.0000E+00 | 0.0000E+00 |
| S5 | −2.8729E−02 | 8.3078E−03 | 0.0000E+00 | 0.0000E+00 | 0.0000E+00 |
| S6 | −3.8635E−02 | 3.0793E−02 | 0.0000E+00 | 0.0000E+00 | 0.0000E+00 |
| S7 | −7.4960E−02 | 2.7970E−02 | 0.0000E+00 | 0.0000E+00 | 0.0000E+00 |
| S8 | −9.8822E−02 | 7.5891E−03 | 0.0000E+00 | 0.0000E+00 | 0.0000E+00 |
| S9 | −2.3394E−02 | −2.2577E−02 | 0.0000E+00 | 0.0000E+00 | 0.0000E+00 |
| S10 | 6.5182E−03 | 1.2636E−03 | 0.0000E+00 | 0.0000E+00 | 0.0000E+00 |
| S11 | −5.1135E−02 | −9.0605E−04 | 0.0000E+00 | 0.0000E+00 | 0.0000E+00 |
| S12 | −5.9963E−02 | 6.2650E−03 | 0.0000E+00 | 0.0000E+00 | 0.0000E+00 |
| S13 | −2.5048E−02 | 2.2374E−02 | −5.1952E−03 | 5.4485E−04 | −2.2198E−05 |
| S14 | −5.4221E−02 | 2.0748E−02 | −5.2541E−03 | 6.5785E−04 | −3.5085E−05 |

Furthermore, TTL=5 mm; f1=4.36 mm; f2=−12.25 mm; f3=92.5 mm; f4=14.43 mm; f5=3.76 mm; f6=−45.93 mm; f7=−2.41 mm and f=4.36 mm; Semi-FOV=36.3°; Fno is: 2.1.

Figure 32:
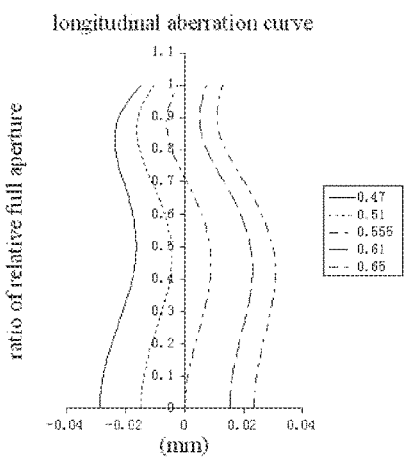
FIG. 32 is a diagram showing a longitudinal aberration curve (mm) of the camera lens in Example 7.
Figure 33:
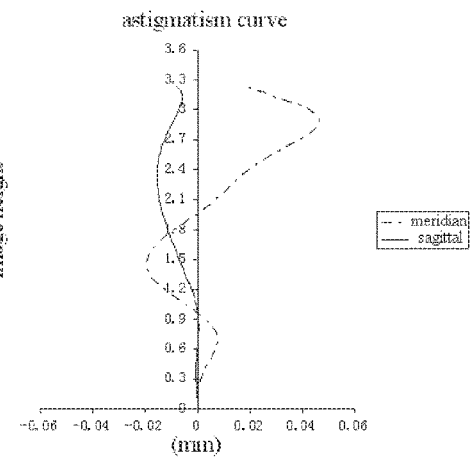
FIG. 33 is a diagram showing an astigmatism curve (mm) of the camera lens in Example 7.
Figure 34:
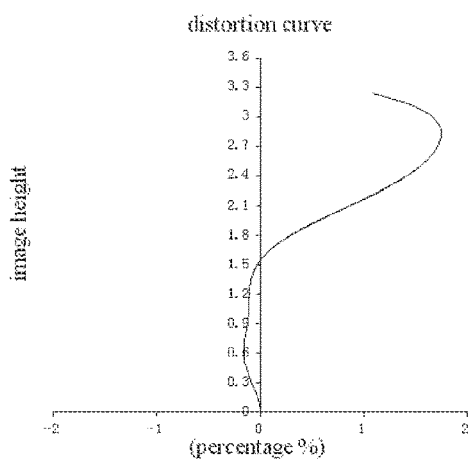
FIG. 34 is a diagram showing a distortion curve (%) of the camera lens in Example 7.
Figure 35:
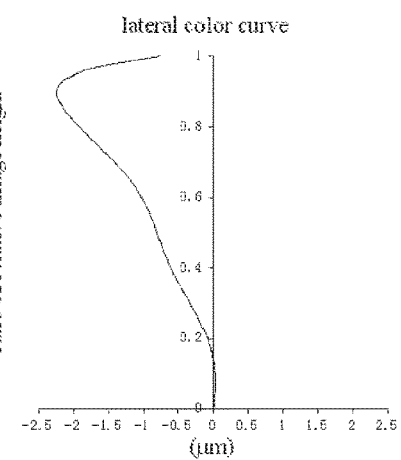
FIG. 35 is a diagram showing a lateral color curve (μm) of the camera lens in Example 7.

FIG. 32 is a diagram showing a longitudinal aberration curve (mm) of the camera lens in Example 7, FIG. 33 is a diagram showing an astigmatism curve (mm) of the camera lens in Example 7, FIG. 34 is a diagram showing a distortion curve (%) of the camera lens in Example 7, and FIG. 35 is a diagram showing a lateral color curve (μm) of the camera lens in Example 7. It can be seen that the aberration of the camera lens may be controlled effectively.

Embodiment 8

In example 8, the camera lens meets the conditions of the following tables:

TABLE 15

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| STO | spherical | infinity | −0.3591 | | 1.0500 | 0.0000 |
| S1 | aspheric | 1.7001 | 0.5480 | 1.54, 56.1 | 1.0639 | −0.0705 |
| S2 | aspheric | 4.4529 | 0.0385 | | 1.0593 | 11.0044 |
| S3 | aspheric | 2.6685 | 0.2573 | 1.64, 23.8 | 1.0643 | 2.0078 |
| S4 | aspheric | 1.6023 | 0.1675 | | 1.0599 | −0.4941 |
| S5 | aspheric | 2.9769 | 0.3994 | 1.54, 56.1 | 1.0804 | −2.0129 |
| S6 | aspheric | 37.8406 | 0.2899 | | 1.1159 | −95.1213 |
| S7 | aspheric | −5.1378 | 0.2350 | 1.54, 56.1 | 1.1299 | 18.7135 |
| S8 | aspheric | −8.8755 | 0.4883 | | 1.2343 | 21.0257 |
| S9 | aspheric | 942.6914 | 0.4342 | 1.54, 56.1 | 1.4147 | 50.0000 |
| S10 | aspheric | −3.3140 | 0.3231 | | 1.6634 | 1.6023 |
| S11 | aspheric | 18.6341 | 0.3282 | 1.64, 23.8 | 1.9179 | −19.8066 |
| S12 | aspheric | −4.4869 | 0.1849 | | 2.1084 | −66.8662 |
| S13 | aspheric | −2.2975 | 0.2350 | 1.54, 56.1 | 2.2073 | −1.8798 |
| S14 | aspheric | 2.3292 | 0.2500 | | 2.5474 | −29.9705 |
| S15 | spherical | infinity | 0.2100 | 1.52, 64.2 | 2.8434 | 0.0000 |
| S16 | spherical | infinity | 0.6306 | | 2.9057 | 0.0000 |
| S17 | spherical | infinity | | | 3.2064 | 0.0000 |

TABLE 16

| No. of surface | A4 | A6 | A8 | A10 | A12 |
|---|---|---|---|---|---|
| S1 | −2.1968E−03 | 7.5211E−03 | 0.0000E+00 | 0.0000E+00 | 0.0000E+00 |
| S2 | −3.5995E−02 | −6.2508E−03 | 0.0000E+00 | 0.0000E+00 | 0.0000E+00 |
| S3 | −1.1153E−01 | 1.7394E−02 | 0.0000E+00 | 0.0000E+00 | 0.0000E+00 |
| S4 | −9.4307E−02 | 4.0258E−02 | 0.0000E+00 | 0.0000E+00 | 0.0000E+00 |
| S5 | −1.8135E−02 | 1.2453E−02 | 0.0000E+00 | 0.0000E+00 | 0.0000E+00 |
| S6 | −8.0454E−03 | 1.9044E−02 | 0.0000E+00 | 0.0000E+00 | 0.0000E+00 |
| S7 | −4.5654E−02 | 3.4257E−02 | 0.0000E+00 | 0.0000E+00 | 0.0000E+00 |
| S8 | −7.5216E−02 | 9.5966E−03 | 0.0000E+00 | 0.0000E+00 | 0.0000E+00 |
| S9 | −1.6339E−02 | −3.5083E−02 | 0.0000E+00 | 0.0000E+00 | 0.0000E+00 |
| S10 | 6.8145E−04 | 4.0310E−03 | 0.0000E+00 | 0.0000E+00 | 0.0000E+00 |
| S11 | −7.2528E−02 | 8.6547E−03 | 0.0000E+00 | 0.0000E+00 | 0.0000E+00 |
| S12 | −1.0426E−03 | −3.5001E−03 | 0.0000E+00 | 0.0000E+00 | 0.0000E+00 |
| S13 | −3.0196E−02 | 6.7729E−02 | −2.7788E−02 | 4.9652E−03 | −3.5379E−04 |
| S14 | −5.0899E−02 | 1.8477E−02 | −4.0970E−03 | 5.2460E−04 | −3.2776E−05 |

Furthermore, TTL=5 mm; f1=4.71 mm; f2=−6.91 mm; f3=5.89 mm; f4=−22.85 mm; f5=6.05 mm; f6=5.68 mm; f7=−2.08 mm and f=4.36 mm; Semi-FOV=36°; Fno is: 2.1.

Figures 39, 40:
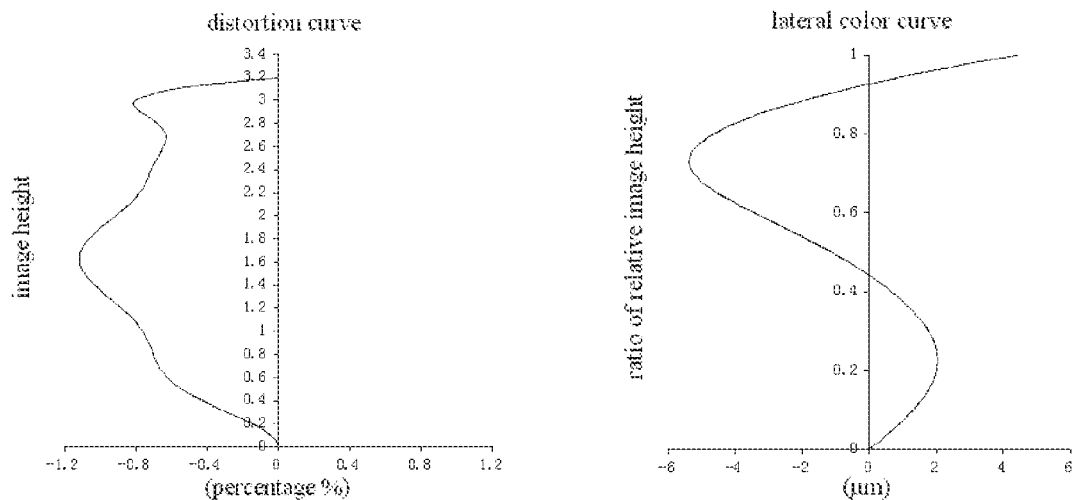
FIG. 39 is a diagram showing a distortion curve (%) of the camera lens in Example 8.
FIG. 40 is a diagram showing a lateral color curve (μm) of the camera lens in Example 8.
Figure 41:
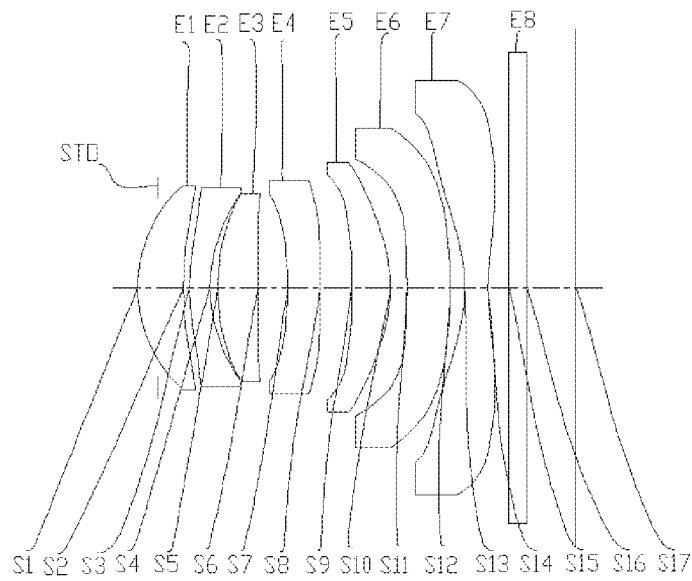
FIG. 41 is a schematic view showing the camera lens according to Example 9 of the present disclosure.

FIG. 37 is a diagram showing a longitudinal aberration curve (mm) of the camera lens in Example 8, FIG. 38 is a diagram showing an astigmatism curve (mm) of the camera lens in Example 8, FIG. 39 is a diagram showing a distortion curve (%) of the camera lens in Example 8, and FIG. 40 is a diagram showing a lateral color curve (μm) of the camera lens in Example 8. It can be seen that the aberration of the camera lens may be controlled effectively.

Embodiment 9

In example 9, the camera lens meets the conditions of the following tables:

Furthermore, TTL=5.52 mm; f1=5.42 mm; f2=−8.04 mm; f3=5.1 mm; f4=−10.2 mm; f5=4.28 mm; f6=10.11 mm; f7=−2.1 mm and f=5 mm; Semi-FOV=30.2°; Fno is: 2.18.

Figures 42, 43:
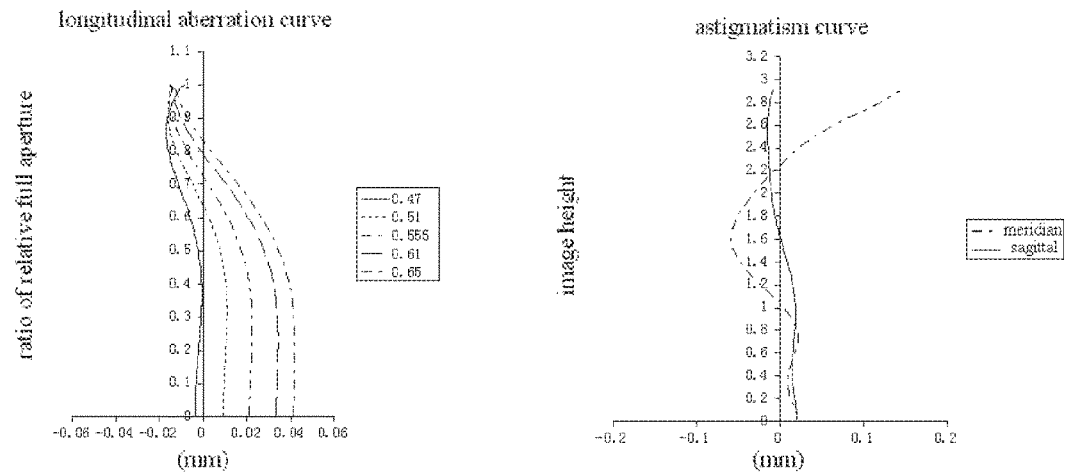
FIG. 42 is a diagram showing a longitudinal aberration curve (mm) of the camera lens in Example 9.
FIG. 43 is a diagram showing an astigmatism curve (mm) of the camera lens in Example 9.
Figures 44, 45:
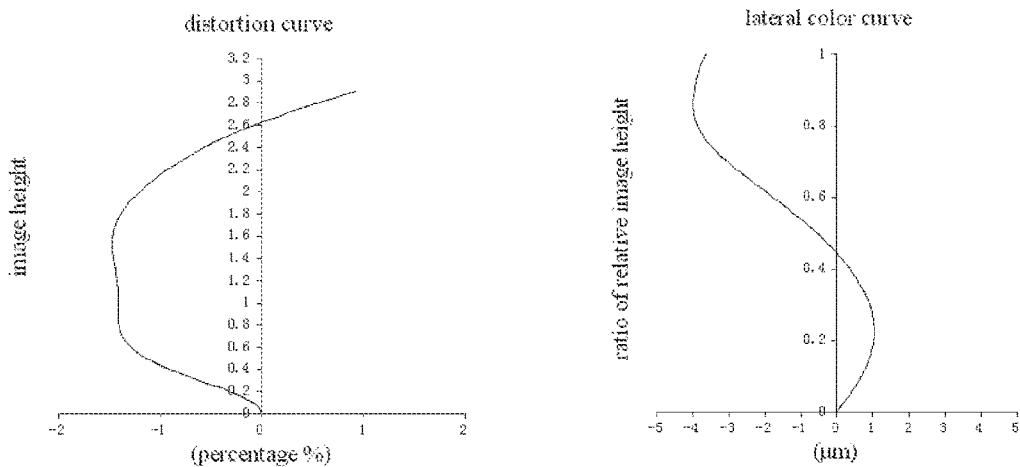
FIG. 44 is a diagram showing a distortion curve (%) of the camera lens in Example 9.
FIG. 45 is a diagram showing a lateral color curve (μm) of the camera lens in Example 9.
Figure 46:
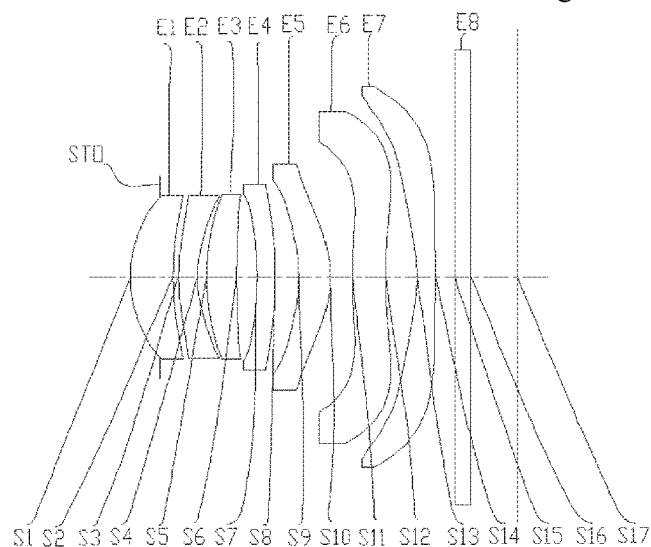
FIG. 46 is a schematic view showing the camera lens according to Example 10 of the present disclosure.

FIG. 42 is a diagram showing a longitudinal aberration curve (mm) of the camera lens in Example 9, FIG. 43 is a diagram showing an astigmatism curve (mm) of the camera lens in Example 9, FIG. 44 is a diagram showing a distortion curve (%) of the camera lens in Example 9, and FIG. 45 is a diagram showing a lateral color curve (μm) of the camera lens in Example 9. It can be seen that the aberration of the camera lens may be controlled effectively.

TABLE 17

| No. of surface | Surface type | Curvature radius | Thickness | Refractive Index/Abbe number | Effective aperture | Conic coefficient |
|---|---|---|---|---|---|---|
| obj | spherical | infinity | infinity |  | infinity | 0.0000 |
| STO | spherical | infinity | −0.2573 |  | 1.0896 | 0.0000 |
| S1 | aspheric | 1.7757 | 0.5781 | 1.54, 56.1 | 1.2456 | 0.0400 |
| S2 | aspheric | 3.9324 | 0.0748 |  | 1.2201 | −2.3425 |
| S3 | aspheric | 2.6347 | 0.2583 | 1.64, 23.8 | 1.2107 | −0.0308 |
| S4 | aspheric | 1.6760 | 0.1014 |  | 1.1568 | −1.9779 |
| S5 | aspheric | 2.6676 | 0.5009 | 1.54, 56.1 | 1.1597 | −3.2798 |
| S6 | aspheric | 62.0152 | 0.3780 |  | 1.1547 | −108.1094 |
| S7 | aspheric | −5.5738 | 0.4110 | 1.54, 56.1 | 1.1610 | 20.6845 |
| S8 | aspheric | 1436.5460 | 0.3969 |  | 1.3014 | 100.0000 |
| S9 | aspheric | −6.0100 | 0.4847 | 1.54, 56.1 | 1.3764 | 10.0609 |
| S10 | aspheric | −1.7306 | 0.2076 |  | 1.5034 | −4.6892 |
| S11 | aspheric | −15.9729 | 0.5461 | 1.64, 23.8 | 1.5583 | −2.0892 |
| S12 | aspheric | −4.6696 | 0.1775 |  | 1.9133 | −100.4680 |
| S13 | aspheric | −2.3366 | 0.2950 | 1.54, 56.1 | 2.0612 | −8.4201 |
| S14 | aspheric | 2.3438 | 0.2693 |  | 2.4012 | −42.3374 |
| S15 | spherical | infinity | 0.2179 | 1.52, 64.2 | 2.5766 | 0.0000 |
| S16 | spherical | infinity | 0.6241 |  | 2.6358 | 0.0000 |
| S17 | spherical | infinity |  |  | 2.9341 | 0.0000 |

TABLE 18

| No. of surface | A4 | A6 | A8 | A10 | A12 |
|---|---|---|---|---|---|
| S1 | −1.2895E−04 | 3.1576E−03 | 0.0000E+00 | 0.0000E+00 | 0.0000E+00 |
| S2 | −1.5861E−02 | −2.0101E−03 | 0.0000E+00 | 0.0000E+00 | 0.0000E+00 |
| S3 | −9.1693E−02 | 1.4596E−02 | 0.0000E+00 | 0.0000E+00 | 0.0000E+00 |
| S4 | −4.9340E−02 | 3.8874E−02 | 0.0000E+00 | 0.0000E+00 | 0.0000E+00 |
| S5 | −2.3269E−04 | 1.8114E−02 | 0.0000E+00 | 0.0000E+00 | 0.0000E+00 |
| S6 | −1.3660E−02 | 1.6768E−02 | 0.0000E+00 | 0.0000E+00 | 0.0000E+00 |
| S7 | −6.4915E−02 | 3.8853E−02 | 0.0000E+00 | 0.0000E+00 | 0.0000E+00 |
| S8 | −7.3583E−02 | 1.6173E−02 | 0.0000E+00 | 0.0000E+00 | 0.0000E+00 |
| S9 | 4.1333E−02 | −3.2253E−02 | 0.0000E+00 | 0.0000E+00 | 0.0000E+00 |
| S10 | 9.1487E−03 | −6.7787E−03 | 0.0000E+00 | 0.0000E+00 | 0.0000E+00 |
| S11 | −3.3390E−02 | −1.8623E−02 | 0.0000E+00 | 0.0000E+00 | 0.0000E+00 |
| S12 | −2.1515E−02 | −3.4124E−03 | 0.0000E+00 | 0.0000E+00 | 0.0000E+00 |
| S13 | −5.0190E−02 | 4.3355E−02 | −1.4324E−02 | 2.3405E−03 | −1.6700E−04 |
| S14 | −3.3595E−02 | 9.0592E−03 | −1.7936E−03 | 2.3569E−04 | −1.6229E−05 |

Embodiment 10

In example 10, the camera lens meets the conditions of the following tables:

TABLE 19

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| STO | spherical | infinity | −0.3801 | | 1.0500 | 0.0000 |
| S1 | aspheric | 1.6450 | 0.5530 | 1.54, 56.1 | 1.0642 | 0.0338 |
| S2 | aspheric | 3.7225 | 0.0698 | | 1.0514 | −1.8209 |
| S3 | aspheric | 2.5701 | 0.2458 | 1.64, 23.8 | 1.0536 | 1.7753 |
| S4 | aspheric | 1.6474 | 0.1174 | | 1.0416 | −1.2417 |
| S5 | aspheric | 2.6642 | 0.3904 | 1.54, 56.1 | 1.0531 | −4.6516 |
| S6 | aspheric | 15.7931 | 0.2643 | | 1.0673 | 13.6082 |
| S7 | aspheric | −4.8050 | 0.2350 | 1.54, 56.1 | 1.0748 | 18.3261 |
| S8 | aspheric | −6.3779 | 0.3001 | | 1.2011 | −97.0770 |
| S9 | aspheric | −2.3569 | 0.4042 | 1.54, 56.1 | 1.2641 | −4.0026 |
| S10 | aspheric | −1.5917 | 0.2907 | | 1.4635 | −1.6688 |
| S11 | aspheric | 5.1849 | 0.4260 | 1.64, 23.8 | 1.7553 | −60.4622 |
| S12 | aspheric | 5.4696 | 0.4071 | | 2.1566 | −11.0779 |
| S13 | aspheric | −1.9933 | 0.2362 | 1.54, 56.1 | 2.3586 | −13.0434 |
| S14 | aspheric | −18.6671 | 0.2500 | | 2.4704 | −94.5627 |
| S15 | spherical | infinity | 0.2100 | 1.52, 64.2 | 2.8984 | 0.0000 |
| S16 | spherical | infinity | 0.6006 | | 2.9525 | 0.0000 |
| S17 | spherical | infinity | | | 3.2107 | 0.0000 |

TABLE 20

| No. of surface | A4 | A6 | A8 | A10 | A12 |
|---|---|---|---|---|---|
| S1 | −1.3352E−03 | 6.0232E−03 | 0.0000E+00 | 0.0000E+00 | 0.0000E+00 |
| S2 | −1.8159E−02 | 2.9754E−05 | 0.0000E+00 | 0.0000E+00 | 0.0000E+00 |
| S3 | −1.1572E−01 | 1.3876E−02 | 0.0000E+00 | 0.0000E+00 | 0.0000E+00 |
| S4 | −9.1056E−02 | 4.6865E−02 | 0.0000E+00 | 0.0000E+00 | 0.0000E+00 |
| S5 | −1.4447E−02 | 1.8116E−02 | 0.0000E+00 | 0.0000E+00 | 0.0000E+00 |
| S6 | −1.7845E−02 | 2.8726E−02 | 0.0000E+00 | 0.0000E+00 | 0.0000E+00 |
| S7 | −4.0260E−02 | 5.4464E−02 | 0.0000E+00 | 0.0000E+00 | 0.0000E+00 |
| S8 | −5.7788E−02 | 2.3057E−02 | 0.0000E+00 | 0.0000E+00 | 0.0000E+00 |
| S9 | 2.6078E−02 | −2.6125E−02 | 0.0000E+00 | 0.0000E+00 | 0.0000E+00 |
| S10 | 3.0520E−02 | 2.8855E−03 | 0.0000E+00 | 0.0000E+00 | 0.0000E+00 |
| S11 | −3.4493E−02 | −8.9498E−03 | 0.0000E+00 | 0.0000E+00 | 0.0000E+00 |
| S12 | −1.6663E−02 | −4.8296E−03 | 0.0000E+00 | 0.0000E+00 | 0.0000E+00 |
| S13 | 3.9674E−02 | −2.0115E−02 | 3.9068E−03 | −5.2039E−04 | 3.6822E−05 |
| S14 | 4.0482E−02 | −3.3334E−02 | 8.9626E−03 | −1.1828E−03 | 5.7590E−05 |

Furthermore, TTL=5.0 mm; f1=4.94 mm; f2=−8.0 mm; f3=5.81 mm; f4=−37.7 mm; f5=7.57 mm; f6=98.2 mm; f7=−4.11 mm and f=4.41 mm; Semi-FOV=36°; Fno is: 2.1.

Figure 47:
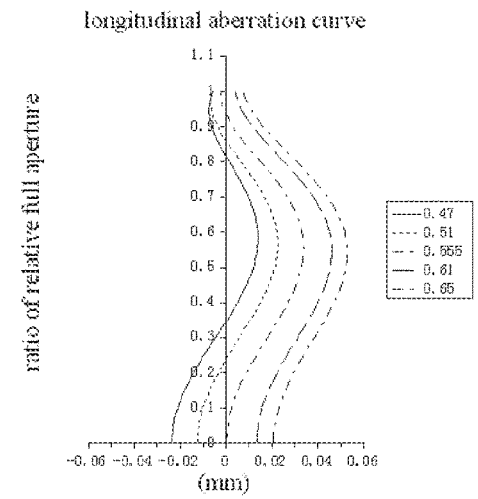
FIG. 47 is a diagram showing a longitudinal aberration curve (mm) of the camera lens in Example 10.
Figure 48:
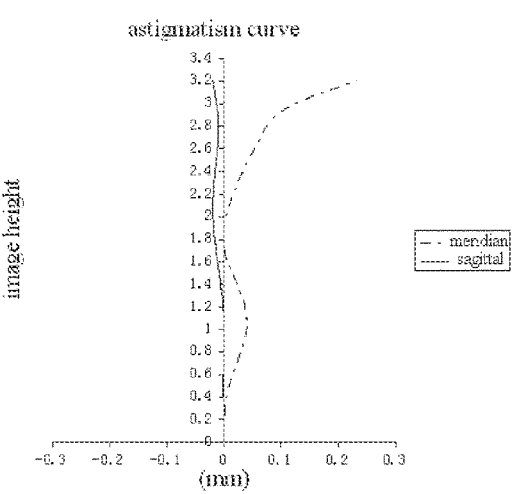
FIG. 48 is a diagram showing an astigmatism curve (mm) of the camera lens in Example 10.
Figure 49:
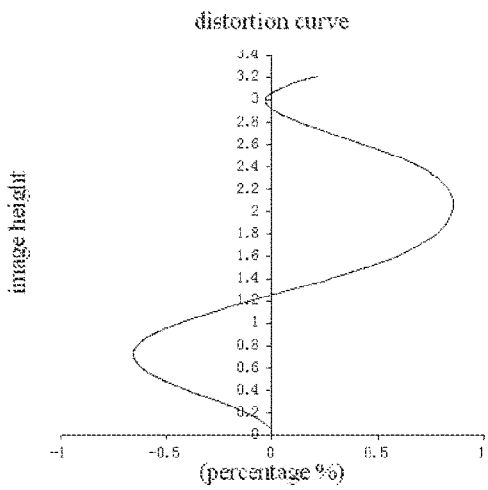
FIG. 49 is a diagram showing a distortion curve (%) of the camera lens in Example 10.
Figure 50:
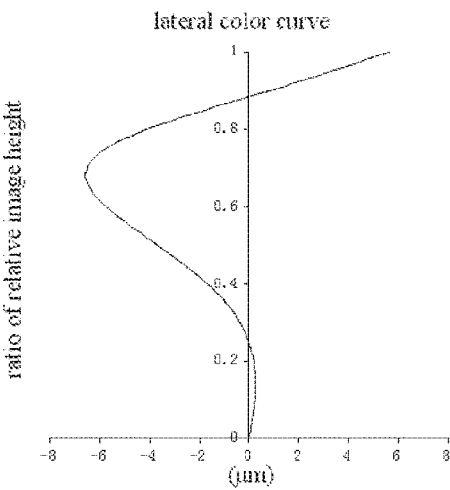
FIG. 50 is a diagram showing a lateral color curve (μm) of the camera lens in Example 10.
Figure 51:
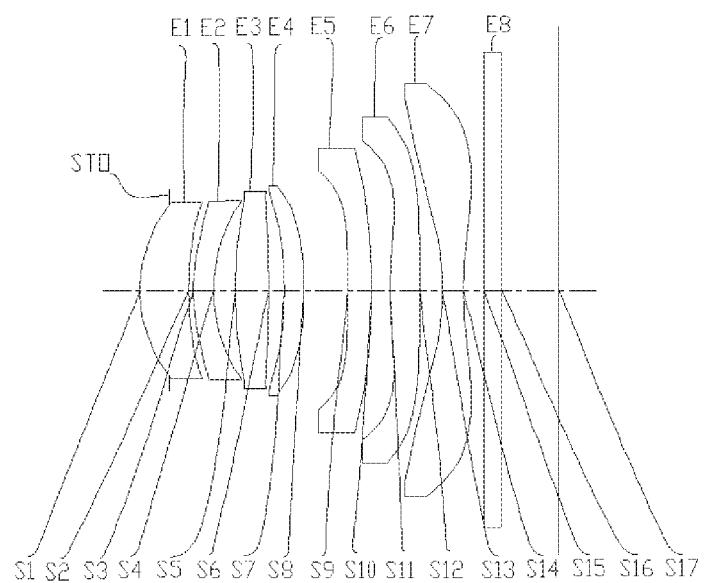
FIG. 51 is a schematic view showing the camera lens according to Example 11 of the present disclosure.

FIG. 47 is a diagram showing a longitudinal aberration curve (mm) of the camera lens in Example 10, FIG. 48 is a diagram showing an astigmatism curve (mm) of the camera lens in Example 10, FIG. 49 is a diagram showing a distortion curve (%) of the camera lens in Example 10, and FIG. 50 is a diagram showing a lateral color curve (μm) of the camera lens in Example 10. It can be seen that the aberration of the camera lens may be controlled effectively.

Embodiment 11

In example 11, the camera lens meets the conditions of the following tables:

TABLE 21

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| STO | spherical | infinity | −0.3565 | | 1.0500 | 0.0000 |
| S1 | aspheric | 1.7159 | 0.5819 | 1.54, 56.1 | 1.0642 | 0.0173 |
| S2 | aspheric | 3.8105 | 0.0579 | | 1.0588 | 9.2363 |
| S3 | aspheric | 2.3211 | 0.2394 | 1.64, 23.8 | 1.0788 | 1.4578 |
| S4 | aspheric | 1.6730 | 0.2640 | | 1.0735 | −1.1853 |
| S5 | aspheric | 4.7478 | 0.4006 | 1.54, 56.1 | 1.1023 | −21.6324 |

TABLE 21-continued

| No. of surface | Surface type | Curvature radius | Thickness | Refractive Index/Abbe number | Effective aperture | Conic coefficient |
|---|---|---|---|---|---|---|
| S6 | aspheric | −14.8783 | 0.1875 | | 1.1916 | −10.6411 |
| S7 | aspheric | −4.5713 | 0.2359 | 1.54, 56.1 | 1.2146 | −60.8643 |
| S8 | aspheric | −5.1674 | 0.5283 | | 1.2645 | −54.3911 |
| S9 | aspheric | −29.0425 | 0.2850 | 1.54, 56.1 | 1.4440 | −99.2644 |
| S10 | aspheric | −9.7739 | 0.2230 | | 1.7153 | 18.8194 |
| S11 | aspheric | 4.3680 | 0.3543 | 1.64, 23.8 | 1.8054 | −30.1238 |
| S12 | aspheric | −113.4699 | 0.2717 | | 2.0921 | 47.7461 |
| S13 | aspheric | −3.8686 | 0.2521 | 1.54, 56.1 | 2.3178 | −1.0005 |
| S14 | aspheric | 3.2844 | 0.2500 | | 2.4929 | −38.7682 |
| S15 | spherical | infinity | 0.2100 | 1.52, 64.2 | 2.8099 | 0.0000 |
| S16 | spherical | infinity | 0.6865 | | 2.8700 | 0.0000 |
| S17 | spherical | infinity | | | 3.1845 | 0.0000 |

TABLE 22

| No. of surface | A4 | A6 | A8 | A10 | A12 |
|---|---|---|---|---|---|
| S1 | −4.0134E−03 | 7.1500E−03 | 0.0000E+00 | 0.0000E+00 | 0.0000E+00 |
| S2 | −3.0943E−02 | −6.0379E−03 | 0.0000E+00 | 0.0000E+00 | 0.0000E+00 |
| S3 | −1.1013E−01 | 2.6265E−02 | 0.0000E+00 | 0.0000E+00 | 0.0000E+00 |
| S4 | −6.0757E−02 | 5.3177E−02 | 0.0000E+00 | 0.0000E+00 | 0.0000E+00 |
| S5 | −5.2997E−03 | 6.8294E−03 | 0.0000E+00 | 0.0000E+00 | 0.0000E+00 |
| S6 | −1.9562E−02 | 1.7328E−02 | 0.0000E+00 | 0.0000E+00 | 0.0000E+00 |
| S7 | −7.5556E−02 | 2.3310E−02 | 0.0000E+00 | 0.0000E+00 | 0.0000E+00 |
| S8 | −9.6740E−02 | 6.1506E−03 | 0.0000E+00 | 0.0000E+00 | 0.0000E+00 |
| S9 | −2.2250E−02 | −2.5318E−02 | 0.0000E+00 | 0.0000E+00 | 0.0000E+00 |
| S10 | −7.6243E−03 | 1.7176E−03 | 0.0000E+00 | 0.0000E+00 | 0.0000E+00 |
| S11 | −3.4769E−02 | −5.0305E−03 | 0.0000E+00 | 0.0000E+00 | 0.0000E+00 |
| S12 | −1.0115E−02 | −2.1405E−03 | 0.0000E+00 | 0.0000E+00 | 0.0000E+00 |
| S13 | −5.4269E−02 | 5.1557E−02 | −1.5913E−02 | 2.1966E−03 | −1.1471E−04 |
| S14 | −1.7013E−02 | −1.6409E−04 | 6.3244E−04 | −2.2280E−04 | 1.8203E−05 |

Furthermore, TTL=5.03 mm; f1=5.25 mm; f2=−11.12 mm; f3=6.7 mm; f4=−85.0 mm; f5=27.07 mm; f6=6.7 mm; f7=−3.24 mm and f=4.4 mm; Semi-FOV=36°; Fno is: 2.1.

Figures 52, 53:
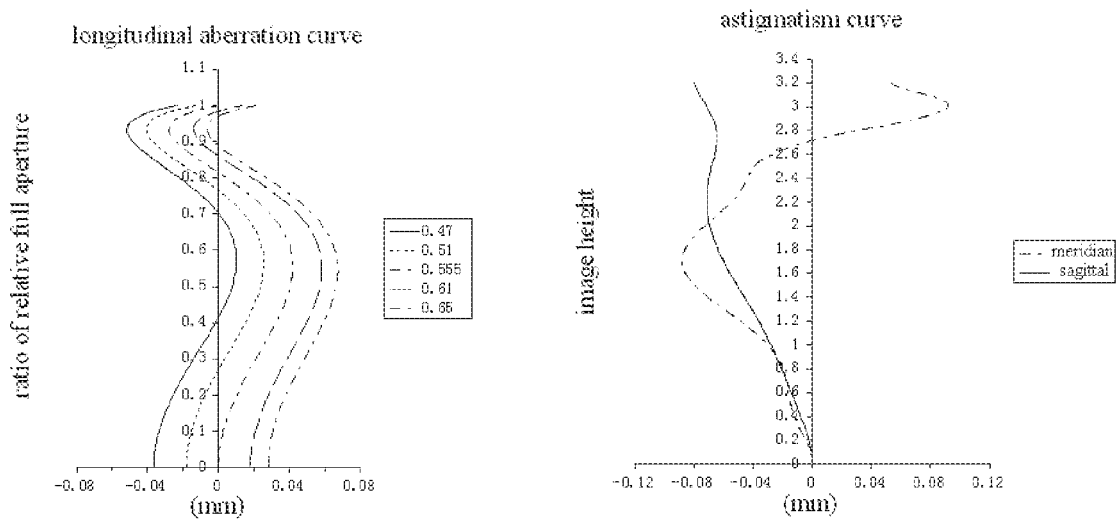
FIG. 52 is a diagram showing a longitudinal aberration curve (mm) of the camera lens in Example 11.
FIG. 53 is a diagram showing an astigmatism curve (mm) of the camera lens in Example 11.
Figures 54, 55:
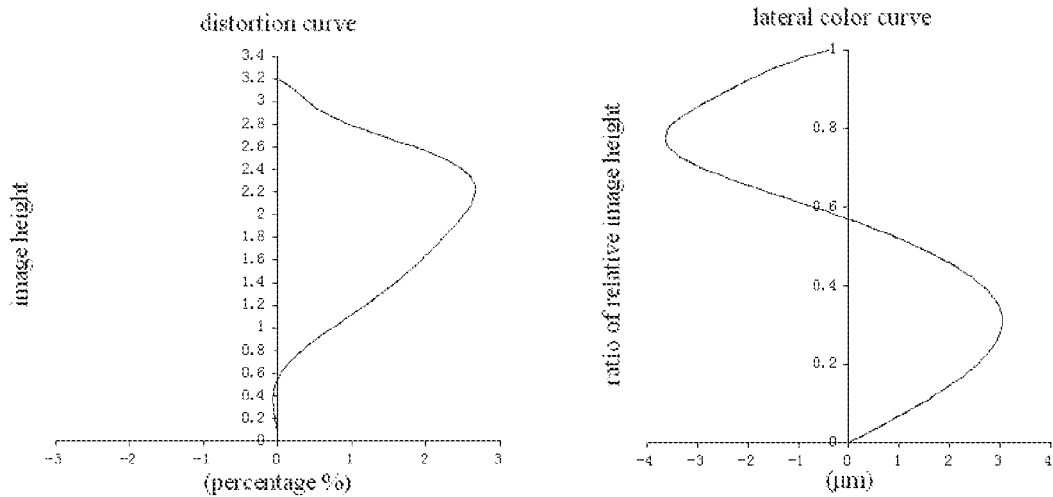
FIG. 54 is a diagram showing a distortion curve (%) of the camera lens in Example 11.
FIG. 55 is a diagram showing a lateral color curve (μm) of the camera lens in Example 11.
Figure 56:
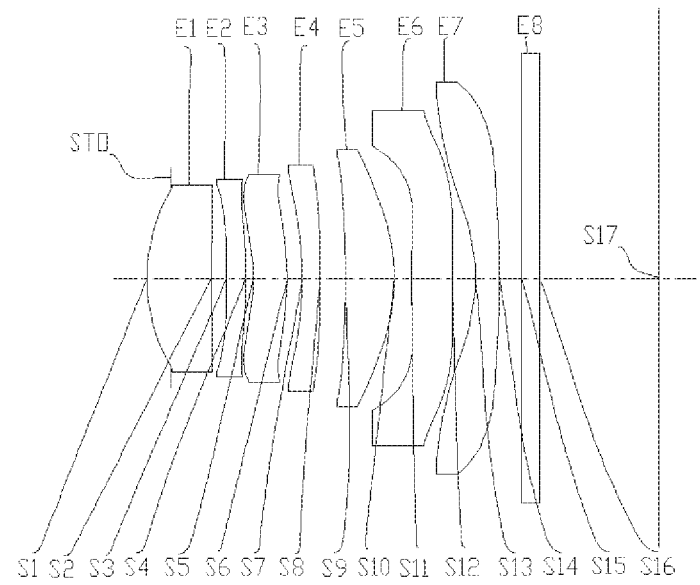
FIG. 56 is a schematic view showing the camera lens according to Example 12 of the present disclosure.

FIG. 52 is a diagram showing a longitudinal aberration curve (mm) of the camera lens in Example 11, FIG. 53 is a diagram showing an astigmatism curve (mm) of the camera lens in Example 11, FIG. 54 is a diagram showing a distortion curve (%) of the camera lens in Example 11, and FIG. 55 is a diagram showing a lateral color curve (μm) of the camera lens in Example 11. It can be seen that the aberration of the camera lens may be controlled effectively.

Embodiment 12

In example 12, the camera lens meets the conditions of the following tables:

TABLE 23

| No. of surface | Surface type | Curvature radius | Thickness | Refractive Index/Abbe number | Effective aperture | Conic coefficient |
|---|---|---|---|---|---|---|
| obj | spherical | infinity | infinity | | infinity | 0.0000 |
| STO | spherical | infinity | −0.2975 | | 1.1156 | 0.0000 |
| S1 | aspheric | 2.2136 | 0.7944 | 1.54, 56.1 | 1.1198 | 0.3204 |
| S2 | aspheric | 11.3041 | 0.1944 | | 1.1445 | −24.0499 |
| S3 | aspheric | −72.9604 | 0.2342 | 1.64, 23.8 | 1.1474 | −1324.5070 |
| S4 | aspheric | −10.0112 | 0.0956 | | 1.1947 | 10.8128 |
| S5 | aspheric | −2.3873 | 0.4230 | 1.54, 56.1 | 1.2153 | −6.6682 |
| S6 | aspheric | −2.9675 | 0.1832 | | 1.2480 | −11.6208 |
| S7 | aspheric | −5.8320 | 0.2248 | 1.54, 56.1 | 1.2743 | 16.9513 |
| S8 | aspheric | −92.8641 | 0.3191 | | 1.3382 | 0.0000 |
| S9 | aspheric | −7.4863 | 0.6003 | 1.54, 56.1 | 1.4191 | −41.4164 |
| S10 | aspheric | −2.2659 | 0.2165 | | 1.4846 | −0.6321 |
| S11 | aspheric | 8.3754 | 0.5051 | 1.64, 23.8 | 1.5191 | −42.7244 |
| S12 | aspheric | 12.2967 | 0.2871 | | 1.7977 | 27.7354 |
| S13 | aspheric | −2.1348 | 0.2971 | 1.54, 56.1 | 1.8536 | −2.4543 |
| S14 | aspheric | −8.2070 | 0.2760 | | 2.0495 | −159.8429 |
| S15 | spherical | infinity | 0.2231 | 1.52, 64.2 | 2.2223 | 0.0000 |
| S16 | spherical | infinity | 1.4790 | | 2.2712 | 0.0000 |
| S17 | spherical | infinity | | | 2.7817 | 0.0000 |

TABLE 24

| No. of surface | A4 | A6 | A8 | A10 | A12 |
|---|---|---|---|---|---|
| S1 | −3.1295E−03 | −9.3657E−04 | 0.0000E+00 | 0.0000E+00 | 0.0000E+00 |
| S2 | −2.5849E−02 | −2.2194E−04 | 0.0000E+00 | 0.0000E+00 | 0.0000E+00 |
| S3 | −7.1894E−02 | 8.8495E−03 | 0.0000E+00 | 0.0000E+00 | 0.0000E+00 |
| S4 | −3.8474E−02 | 3.8289E−02 | 0.0000E+00 | 0.0000E+00 | 0.0000E+00 |
| S5 | 1.5806E−02 | 3.7937E−02 | 0.0000E+00 | 0.0000E+00 | 0.0000E+00 |
| S6 | 1.0327E−02 | 1.7867E−02 | 0.0000E+00 | 0.0000E+00 | 0.0000E+00 |
| S7 | −5.1188E−02 | 4.0425E−02 | 0.0000E+00 | 0.0000E+00 | 0.0000E+00 |
| S8 | −4.3124E−02 | 1.2066E−02 | 0.0000E+00 | 0.0000E+00 | 0.0000E+00 |
| S9 | 2.8885E−02 | −1.1791E−02 | 0.0000E+00 | 0.0000E+00 | 0.0000E+00 |
| S10 | 2.5107E−02 | −2.2291E−03 | 0.0000E+00 | 0.0000E+00 | 0.0000E+00 |
| S11 | −4.4871E−02 | −1.5157E−02 | 0.0000E+00 | 0.0000E+00 | 0.0000E+00 |
| S12 | −6.2404E−02 | 7.0044E−03 | 0.0000E+00 | 0.0000E+00 | 0.0000E+00 |
| S13 | 1.7420E−02 | −6.3214E−04 | 1.3154E−03 | −4.0534E−04 | 3.1978E−05 |
| S14 | 1.4388E−02 | −6.3657E−03 | −3.7915E−04 | 3.0347E−04 | −3.0336E−05 |

Furthermore, TTL=6.35 mm; f1=4.89 mm; f2=18.07 mm; f3=−30.1 mm; f4=−11.4 mm; f5=5.72 mm; f6=39 mm; f7=−5.37 mm and f=5.3 mm; Semi-FOV=28°; Fno is: 2.23.

Figure 57:
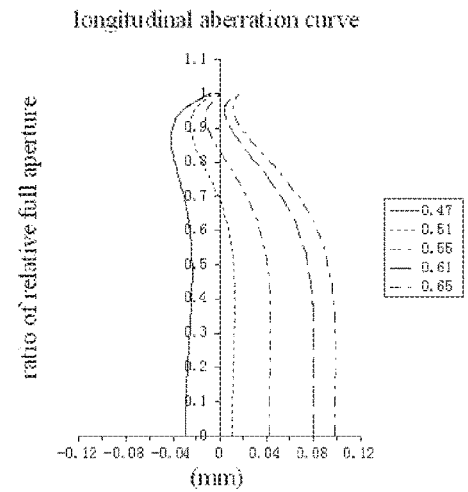
FIG. 57 is a diagram showing a longitudinal aberration curve (mm) of the camera lens in Example 12.
Figure 58:
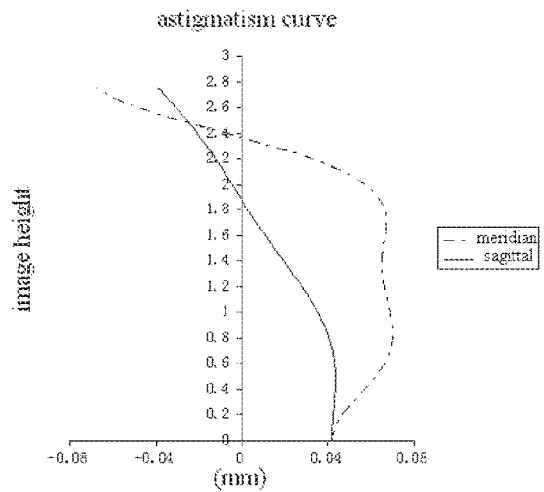
FIG. 58 is a diagram showing an astigmatism curve (mm) of the camera lens in Example 12.
Figure 59:
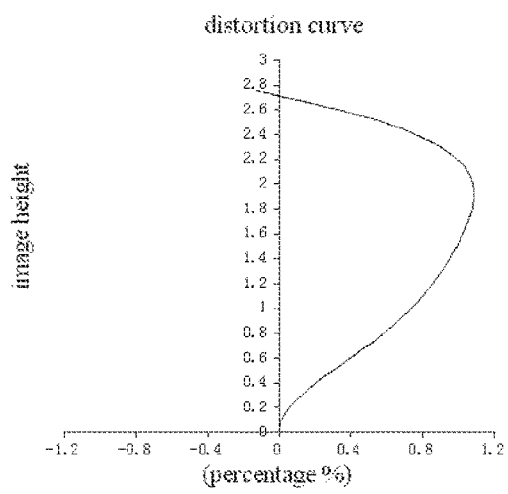
FIG. 59 is a diagram showing a distortion curve (%) of the camera lens in Example 12.
Figure 60:
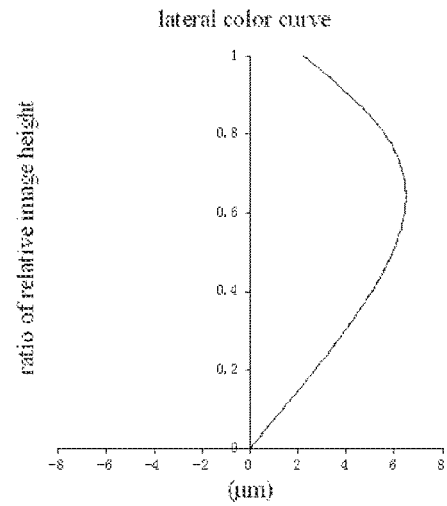
FIG. 60 is a diagram showing a lateral color curve (μm) of the camera lens in Example 12.

FIG. 57 is a diagram showing a longitudinal aberration curve (mm) of the camera lens in Example 12, FIG. 58 is a diagram showing an astigmatism curve (mm) of the camera lens in Example 12, FIG. 59 is a diagram showing a distortion curve (%) of the camera lens in Example 12, and FIG. 60 is a diagram showing a lateral color curve (μm) of the camera lens in Example 12. It can be seen that the aberration of the camera lens may be controlled effectively.

In examples 1 to 12, formulas meets the conditions of the following tables:

TABLE 25

| | Embodiment | | | | | |
|---|---|---|---|---|---|---|
| | 1 | 2 | 3 | 4 | 5 | 6 |
| TTL/ImgH | 1.62 | 2.1 | 1.44 | 1.44 | 1.44 | 1.6 |
| CT1/CT2 | 2.25 | 2.1 | 2.04 | 2.28 | 2.28 | 1.96 |
| f123/f567 | −0.41 | −0.57 | −0.61 | −0.51 | −0.59 | −0.37 |
| f23/f | 4.16 | −11.4 | −7.74 | −1.1 | −1.09 | 4.74 |
| f1/f | 1.24 | 1.05 | 1.05 | 1 | 1.04 | 1.58 |
| (R1 + R2)/(R1 − R2) | −3 | −1.9 | −1.87 | −1.32 | −1.44 | −3 |
| f5/f | 1.95 | 1.32 | 1.49 | 2.04 | 2.16 | 2.37 |
| R10/f | −0.51 | −0.33 | −0.33 | −0.33 | −0.33 | −0.64 |
| f7/f | −0.64 | −0.65 | −0.66 | −0.82 | −1.04 | −0.97 |
| R13/f | −0.38 | −0.72 | −0.74 | −1.43 | −2.55 | −0.63 |
| f/f123 | 1.03 | 0.91 | 0.88 | 0.87 | 0.9 | 0.83 |
| f567/f | −2.36 | −1.92 | −1.87 | −2.26 | −1.87 | −3.28 |

TABLE 26

| | Embodiment | | | | | |
|---|---|---|---|---|---|---|
| | 7 | 8 | 9 | 10 | 11 | 12 |
| TTL/ImgH | 1.55 | 1.58 | 1.9 | 1.56 | 1.56 | 2.31 |
| CT1/CT2 | 2.32 | 2.13 | 2.24 | 2.25 | 2.43 | 3.39 |
| f123/f567 | −0.63 | −0.3 | −0.31 | −0.3 | −0.38 | 0.2 |
| f23/f | −3.19 | 10 | 3 | 5.4 | 3.93 | 9.7 |
| f1/f | 1 | 1.07 | 1.22 | 1.12 | 1.2 | 0.92 |
| (R1 + R2)/(R1 − R2) | −1.8 | −2.24 | −2.65 | −2.58 | −2.64 | −1.49 |
| f5/f | 0.86 | 1.37 | 0.86 | 1.72 | 6.15 | 1.08 |
| R10/f | −0.37 | −0.74 | −0.35 | −0.36 | −2.22 | −0.43 |
| f7/f | −0.55 | −0.47 | −0.46 | −0.93 | −0.74 | −1.01 |
| R13/f | −0.58 | −0.52 | −0.47 | −0.45 | −0.88 | −0.4 |
| f/f123 | 0.78 | 1.04 | 1.03 | 1.07 | 1.04 | 1.11 |
| f567/f | −2.04 | −3.23 | −2.65 | −3.15 | −2.55 | 4.55 |

Reference throughout this specification to terms "an embodiment", "some embodiments", "exemplary embodiment", "an example", "a specific example" or "some examples" means that a particular feature, structure, refractive index/abbe number, or characteristic described in connection with the embodiment or example is included in at least one embodiment or example of the present disclosure. Thus, the exemplary expressions of terms described above are not necessarily referring to the same embodiment or example of the present disclosure. Furthermore, the particular features, structures, materials, or characteristics may be combined in any suitable manner in one or more embodiments or examples.

Although explanatory embodiments of the present invention have been shown and described, it would be appreciated by those ordinary skilled in the art that various changes, modifications, alternatives and variants can be made in these embodiments without departing from principles and spirits of the present invention, and the scope of the present invention is restricted by claims and their equivalents.

What is claimed is:

1. A camera lens, comprising a first lens, a second lens, a third lens, a fourth lens, a fifth lens, a sixth lens and a seventh lens from an object side of the camera lens to an image side of the camera lens in turn, wherein
   the first lens is of a positive focal power, an object side surface of the first lens is convex;
   an object side surface of the fourth lens is concave;
   the fifth lens is of a positive focal power;
   the seventh lens is of a negative focal power,
   wherein the camera lens further comprises an aperture stop arranged between a photographed object and the second lens,
   the camera lens meets the following formula:

$TTL/\mathrm{Img}H < 2.4;$ $1.5 < CT1/CT2 < 4,$ wherein TTL is a total length of the camera lens,
   ImgH equals to half of a diameter of an effective pixel region at an imaging side surface,
   CT1 is a central thickness of the first lens, and
   CT2 is a central thickness of the second lens,
   wherein the camera lens meets the following formula:

$|f23/f| < 12,$ wherein f23 represents a combined focal length of the second lens and the third lens, and
   f represents an effective focal length of the camera lens.

2. The camera lens according to claim 1, wherein an image side surface of the first lens is concave, an image side surface of the fifth lens is convex, and an object side surface of the seventh lens is concave.

3. The camera lens according to claim 1, wherein the camera lens meets the following formula:

$$0<f1/f<2; \text{ and}$$

$$-4<(R1+R2)/(R1-R2)<-1,$$

wherein f1 represents a focal length of the first lens, and R1 and R2 represent curvature radiuses of the object side surface and the image side surface of the first lens, respectively.

4. The camera lens according to claim 1, wherein the camera lens meets the following formula:

$$0<f5/f<6.5; \text{ and}$$

$$-2.5<R10/f<0,$$

wherein f5 represents a focal length of the fifth lens, and R10 represents a curvature radius of the image side surface of the fifth lens.

5. The camera lens according to claim 1, wherein the camera lens meets the following formula:

$$-1.5<f7/f<0; \text{ and}$$

$$-3.0<R13/f<0,$$

wherein f7 represents a focal length of the seventh lens, and R13 represents a curvature radius of the object side surface of the seventh lens.

6. The camera lens according to claim 1, wherein the camera lens meets the following formula:

$$0.5<f/f123<1.5,$$

wherein f123 represents a combined focal length of the first lens, the second lens and the third lens.

7. The camera lens according to claim 1, wherein the second lens is of a negative focal power, an object side surface of the second lens is convex, and an image side surface of the second lens is concave; and the third lens is of a positive focal power, an object side surface of the third lens is convex, and an image side surface of the third lens is concave.

8. The camera lens according to claim 1, wherein an image side surface of the fourth lens is convex,
an object side surface of the fifth lens is concave; and
an object side surface of the sixth lens is convex.

9. A camera lens, comprising a first lens, a second lens, a third lens, a fourth lens, a fifth lens, a sixth lens and a seventh lens from an object side of the camera lens to an image side of the camera lens in turn, wherein
the first lens is of a positive focal power, an object side surface of the first lens is convex;
the second lens is of a negative focal power;
an object side surface of the third lens is convex and an image side surface of the third lens is concave;
the fifth lens is of a positive focal power; and
the seventh lens is of a negative focal power,
wherein the camera lens further comprises an aperture stop arranged between a photographed object and the second lens,
the camera lens meets the following formula:

$$TTL/\text{ImgH}<2.4,$$

wherein TTL is a total length of the camera lens, and ImgH equals to half of a diameter of an effective pixel region at an imaging side surface, wherein the camera lens meets the following formula:

$$|f23/f|<12,$$

wherein f23 represents a combined focal length of the second lens and the third lens, and
f represents a total focal length of the camera lens.

10. The camera lens according to claim 9, wherein the camera lens meets the following formula:

$$f123/f567 \leq -0.3,$$

wherein f123 represents a combined focal length of the first lens, the second lens and the third lens, and
f567 represents a combined focal length of the fifth lens, the sixth lens and the seventh lens.

11. The camera lens according to claim 10, wherein the camera lens meets the following formula:

$$-5<f567/f<-1,$$

wherein f567 represents a combined focal length of the fifth lens, the sixth lens and the seventh lens.

12. The camera lens according to claim 10, wherein the camera lens meets the following formula:

$$1 \leq f1/f<2; \text{ and}$$

$$-4<(R1+R2)/(R1-R2)<-1,$$

wherein f1 represents a focal length of the first lens, and R1 and R2 represent curvature radiuses of the object side surface and the image side surface of the first lens, respectively.

13. The camera lens according to claim 10, wherein the camera lens meets the following formula:

$$0<f5/f<3; \text{ and}$$

$$-1<R10/f<0,$$

wherein f5 represents a focal length of the fifth lens, and R10 represents a curvature radius of the image side surface of the fifth lens.

14. The camera lens according to claim 10, wherein the camera lens meets the following formula:

$$-1.5<f7/f<0; \text{ and}$$

$$-3.0<R13/f<0,$$

wherein f7 represents a focal length of the seventh lens, and R13 represents a curvature radius of the object side surface of the seventh lens.

15. The camera lens according to claim 10, wherein
an object side surface of the fourth lens is concave,
an image side surface of the fourth lens is convex,
an object side surface of the fifth lens is concave, and
an object side surface of the sixth lens is convex.

16. The camera lens according to claim 9, wherein an object side surface of the second lens is convex, and an image side surface of the second lens is concave.

17. The camera lens according to claim 9, wherein
an image side surface of the first lens is concave,
an image side surface of the fifth lens is convex, and
an object side surface of the seventh lens is concave.

18. The camera lens according to claim 9, wherein the third lens of the camera lens is of a positive focal power.

* * * * *